United States Patent
Bauer et al.

[19]

[11] Patent Number: 5,870,765
[45] Date of Patent: Feb. 9, 1999

[54] DATABASE SYNCHRONIZER

[75] Inventors: Jonathan A. Bauer, Andover; Andrew Bodge, Acton; Steven Huberman, Carlisle, all of Mass.

[73] Assignee: Oracle Corporation, Redwood Shores, Calif.

[21] Appl. No.: 728,345

[22] Filed: Oct. 9, 1996

[51] Int. Cl.$^6$ ................................................. G06F 17/00
[52] U.S. Cl. ........................... 707/203; 707/8; 707/10; 707/201
[58] Field of Search ........................................ 707/1–206

[56] References Cited

U.S. PATENT DOCUMENTS

| | | | |
|---|---|---|---|
| 5,222,140 | 6/1993 | Beller et al. | 380/30 |
| 5,528,677 | 6/1996 | Butler et al. | 379/196 |
| 5,608,720 | 3/1997 | Biegel et al. | 370/249 |
| 5,689,705 | 11/1997 | Fino et al. | 1/1 |

OTHER PUBLICATIONS

"Replicating Access Databases," *Byte*, p. 182, (Dec. 1995).
Andrews, D., "Swiss Army Knife for Data Replication," *Byte*, p. 36, (Dec. 1995).
Watcom International Corp., "Watcom to Demonstrate Database Replication Technology for Mass Deployment," Press Release (Jun. 1995).
Alesandrini, K., "Windows 95 Makes Contact," *Computer Shopper*, pp. 578–584, (Jan. 1996).
Kähler, B., et al., "Extending Logging for Database Snapshot Refresh," Proceedings of the 13th VLDB Conference, pp. 389–398, (Brighton 1987).
Kawell, L., Jr., et al., "Replicated Document Management in a Group Communication System," pp. 1–15, (Sep. 1992).
Watcom SQL brochure comprising 2 pages.
Lindsay, B., et al., "A Snapshot Differential Refresh Algorithm," pp. 53–60, (1986). Proceedings of SIGMOD '86 International Conference on Management of Data, (Washington, D.C., May 28–30, 1986).
Badrinath, B.R., et al., "Replication and Mobility," Rutgers University, pp. 1–4.
Garcie–Molina, H., et al., "Data–Patch: Integrating Inconsistent Copies Of A Database After A Partition," *IEEE*, Proceedings of the 3rd IEEE Symposium on Reliability in Distr. Software and Database Systems, pp. 38–44, (1983).
Draft Distributed Database Management in the SAC C3 Experiment (Follow On), Technical Proposal RSD–83–08–3, pp. 19–33, (Aug. 25, 1983).
Pu, C., et al., "Replica Control in Distributed Systems: An Asynchronous Approach," *ACM*, 20(2):377–386, (1991).
Alonso, R., et al., "Database System Issues in Nomadic Computing," pp. 1–9.
"InfoDB," 8(1):1–12, (Spring 1994).
Pu, C., et al., "Regeneration of Replicated Objects: A Technique and Its Eden Implementation," *IEEE Transactions On Software Engineering*, 14(7):936–945, (Jul. 1988).
Demers, A., et al., "Epidemic Algorithm for Replicated Database Maintenance," *Operating System Review*, 22(1):8–32, (Aug. 1987).
Davidson, S.B, "Optimism and Consistency in Partitioned Distributed Database Systems," *ACM Transaction on Database Systems*, 9(3):456–481, (Sep. 1984).
Kung, H.T., et al., "On Optimistic Methods for Concurrency Control," *ACM Transaction on Database Systems*, 6(2):213–226, (Jun. 1981).
Reichard, K., et al., "Share The Wealth," *PC Magazine*, 14(14):243–277, (Aug. 1995).

*Primary Examiner*—Wayne Amsbury
*Assistant Examiner*—David Yiuk Jung
*Attorney, Agent, or Firm*—Hamilton, Brook, Smith & Reynolds, P.C.

[57] ABSTRACT

A database synchronizer facilitates computing systems which have client-side and server-side applications that share data in similar database structures, but which do not maintain a continuous connection to a single shared data source. In general, a database synchronizer is used to share data among many nodes on the computing system. The database synchronizer is used to synchronize the data in a central database for a particular client with the data on that client's intermittently-connected computer. Updates performed by either client or server are propagated to the other side when a connection is established and eventually from the server to other clients in the system.

54 Claims, 10 Drawing Sheets

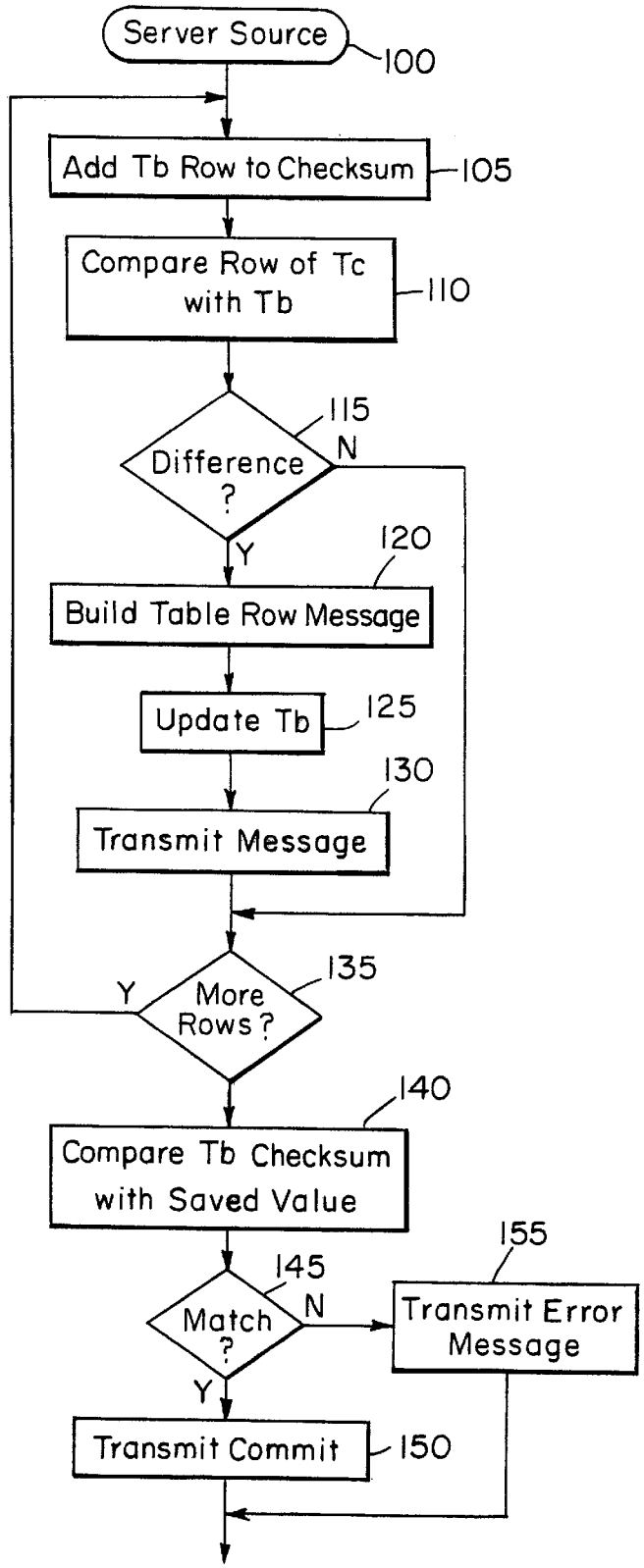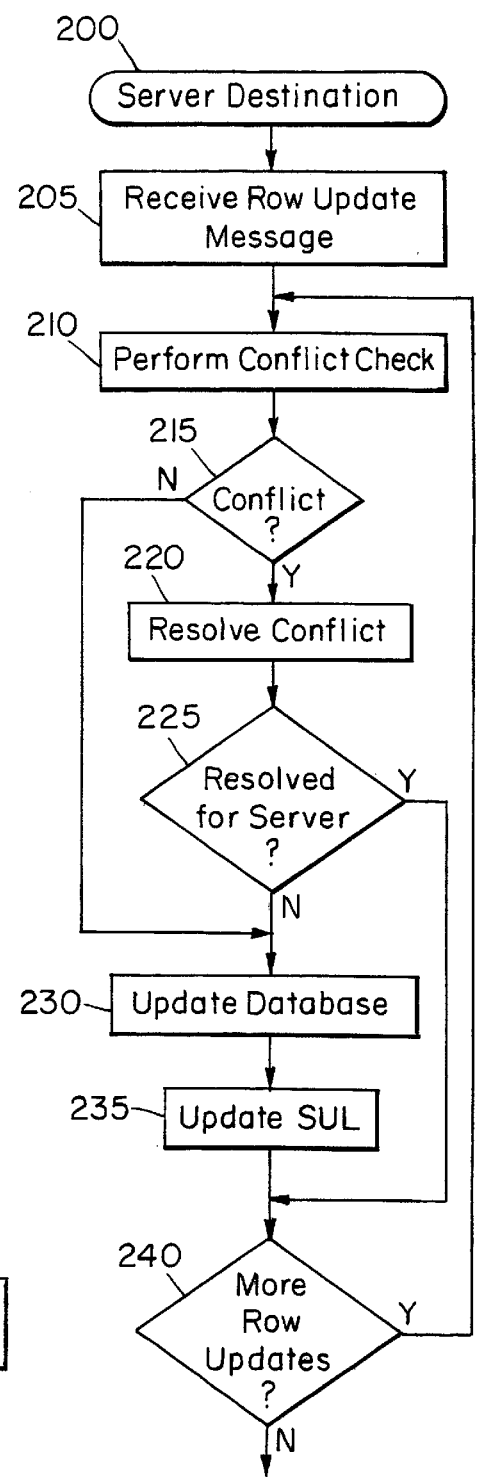
FIG. 5A
FIG. 5B

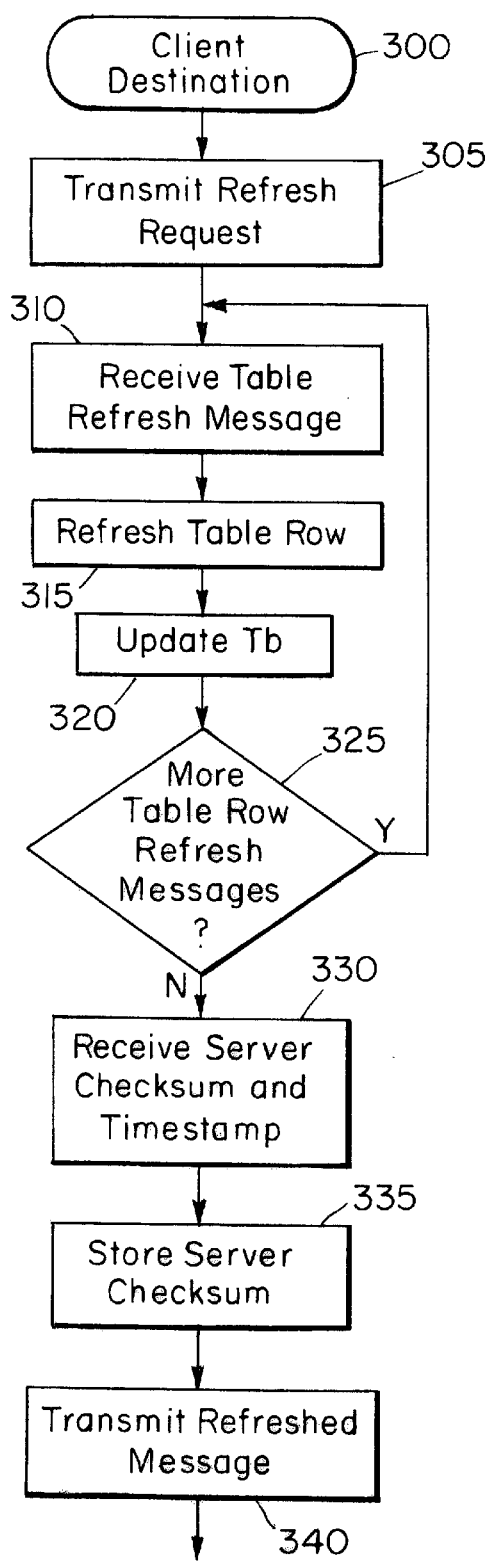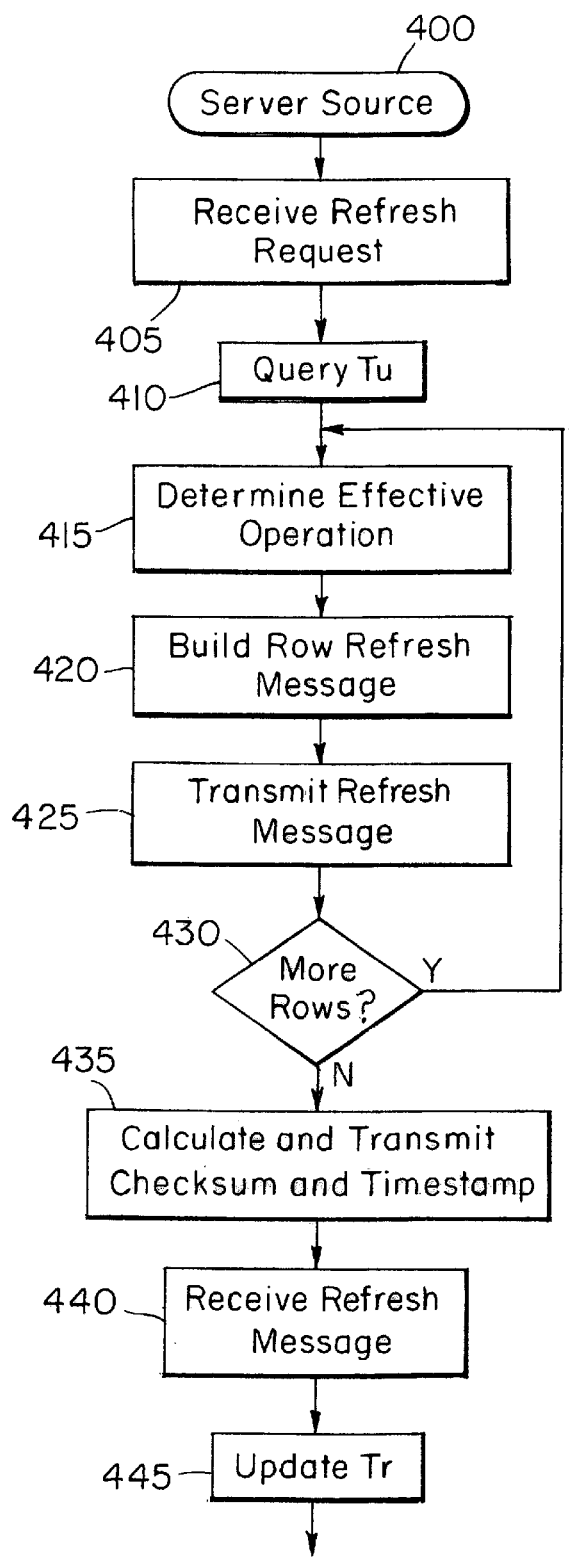
FIG. 6A
FIG. 6B

FIG. 8A

| K$_{12}$ | C1$_{12}$ | C2$_{12}$ | C3$_{12}$ | C4$_{12}$ |
|---|---|---|---|---|
| R1$_{12}$ | 1 | A | B | C | D |
| R2$_{12}$ | 2 | E | F | G | H |
| R3$_{12}$ | 3 | I | J | K | L |
| R4$_{12}$ | 4 | M | N | O | P |

| K$_{22}$ | C1$_{22}$ | C2$_{22}$ | C3$_{22}$ | C4$_{22}$ |
|---|---|---|---|---|
| R1$_{22}$ | 1 | A | B | D | Q |
| R2$_{22}$ | 4 | M | N | P | R |
| R3$_{22}$ | 5 | S | T | U | V |

| Ks | C1s | C2s | C3s |
|---|---|---|---|
| Rs(1) | 1 | A | B | D |
| Rs(4) | 4 | M | N | P |

| Kc | C1c | C2c | C3c |
|---|---|---|---|
| Rc(1) | 1 | A | B | D |
| Rc(4) | 4 | M | N | P |

| Lc |
|---|
| C1$_{22}$ |
| C2$_{22}$ |
| C3$_{22}$ |

FIG. 10B

| Kb | C1b | C2b | C3b |
|---|---|---|---|
| Rb(1) | 1 | A | B | D |
| Rb(4) | 4 | M | N | P |

| Ls |
|---|
| C1$_{12}$ |
| C2$_{12}$ |
| C4$_{12}$ |

FIG. 11B

| OPu | OPtu | IDu | Rtu | Ku | C1u | C2u | C3u |
|---|---|---|---|---|---|---|---|
| I | t∅ | null | null | 1 | A | B | D |
| I | t∅ | null | null | 4 | M | N | P |

| IDr | Rtr | | Rr(a) | Rr(x) | Rr(z) |
|---|---|---|---|---|---|
| a | t∅a | ... | | | |
| x | t∅x | ... | | | |
| z | t∅z | ... | | | |

| Ts \ | Ks | C1s | C2s | C3s |
|---|---|---|---|---|
| Rs(1) | 1 | A' | B | D |
| Rs(4) | 4 | M' | N | P |

FIG. 12B (Tu)

| | OPu | OPtu | IDu | Rtu | Ku | C1u | C2u | C3u |
|---|---|---|---|---|---|---|---|---|
| Ru(1,t0) | I | t0 | null | null | 1 | A | B | D |
| Ru(4,t0) | I | t0 | null | null | 4 | M | N | P |
| Ru(1,t1) | U | t1 | a | null | 1 | A | B | D |
| Ru(4,t2) | U | t2 | z | null | 4 | M | N | P |

FIG. 13

| Tc \ | Kc | C1c | C2c | C3c |
|---|---|---|---|---|
| Rc(1) | 1 | A'' | B | D |
| Rc(4) | 4 | M | N | P'' |

FIG. 15A

| Ts \ | Ks | C1s | C2s | C3s |
|---|---|---|---|---|
| Rs(1) | 1 | A' | B | D |
| Rs(4) | 4 | M' | N | P'' |

FIG. 15B (Tu)

| | OPu | OPtu | IDu | Rtu | Ku | C1u | C2u | C3u |
|---|---|---|---|---|---|---|---|---|
| Ru(1,t0) | I | t0 | null | null | 1 | A | B | D |
| Ru(4,t0) | I | t0 | null | null | 4 | M | N | P |
| Ru(1,t1) | U | t1 | a | null | 1 | A | B | D |
| Ru(4,t2) | U | t2 | z | null | 4 | M | N | P |
| Ru(4,t3) | U | t3 | x | null | 4 | M' | N | P |
| Ru(4,t4) | S-U | t4 | q | null | 4 | — | — | — |

FIG. 17A

| Tc \ | Kc | C1c | C2c | C3c |
|---|---|---|---|---|
| Rc(1) | 1 | A' | B | D |
| Rc(4) | 4 | M' | N | P'' |

FIG. 17B

| Tb \ | Kb | C1b | C2b | C3b |
|---|---|---|---|---|
| Rb(1) | 1 | A' | B | D |
| Rb(4) | 4 | M' | N | P'' |

FIG. 18

| Tr \ | IDr | Rtr |
|---|---|---|
| | ⋮ | |
| Rr(x) | x | t4 |
| | ⋮ | |

| time | Rs(k):cv | Rc(k):cv | pSEO(m-1) | Ru(k(m)):op | Ru(k(m)):id='x' | pSEO(m) | pbv(m) | Conflict | Ts(filt) | Tu(filt) | CEO |
|------|----------|----------|-----------|-------------|-----------------|---------|--------|----------|----------|----------|-----|
| t0 | A | A | | | | NoOp | A | | | | |
| t1 | A' | A | NoOp | Update | False | Update | A | | | | |
| t3.5 | A' | A'' | | | | | | | | | |
| t3 | A' | A'' | | | | | Update | | | | |

FIG. 19A

| time | Rs(k):cv | Rc(k):cv | pSEO(m-1) | Ru(k(m)):op | Ru(k(m)):id='x' | pSEO(m) | pbv(m) | Conflict | Ts(filt) | Tu(filt) | CEO |
|------|----------|----------|-----------|-------------|-----------------|---------|--------|----------|----------|----------|-----|
| t0 | A | A | | | | NoOp | A | | | | |
| t1 | A' | A | NoOp | Update | False | Update | A | | | | |
| t2.5 | A' | A'' | | | | | | | | | |
| t3 | A' | A'' | Update | Update | False | Update | A | | | | |
| t3.5 | A' | A'' | | | | | | | | | |
| t4 | A' | A' | Update | | | | | | True | True | Update |

FIG. 19B

DATABASE SYNCHRONIZER

BACKGROUND OF THE INVENTION

Portable computers are becoming more and more popular in the business world. In addition to being convenient, portable computing allows an organization to extend its production system further into the field. Whether a user is taking orders, doing field service, or delivering packages, the user is executing transactions against an organization's production system. Portable computers enable a user to perform these transactions on the spot and in a timely manner.

A user of a portable computer is, in effect, operating as a client to the organization's production system server. The client is, however, not usually connected to the server and must operate autonomously, such as by taking orders or querying the status of orders. To successfully perform these tasks, the client maintains a local replica of the server's data.

While multiple copies of data exist, these copies need to be kept consistent. While disconnected, applications at each client and at the server may modify their data. To achieve consistency, connections must be made and individual clients synchronized with the server. In this way, modifications made at one client are propagated to the server and eventually to each client as it connects.

The synchronization is difficult to achieve, even in situations where the server and all clients are running the same database management system software. Unfortunately, this is not generally the case. Clients are often personal computers running single-user database software whereas the server is usually a higher-powered multi-user system running very different database software designed to hold much more data and service many users.

One prior art approach to synchronization has been to transmit a copy of the replica from the server to each client. This approach is possible when all modifications are done at the server and propagated to the client for read-only use. When updates can also occur at the client, separate table pairs can be used to propagate changes in each direction.

Many organizations have, in the absence of any specific tools, developed ad-hoc solutions. These are time consuming to develop, difficult to maintain, non-general, and less reliable in that they generally do not properly recover from errors such as power failures, line failures, and system crashes.

SUMMARY OF THE INVENTION

As used herein, the term synchronize is defined to be the act whereby data in two databases are restored to consistency. That is, updates performed by either client or server are propagated to the other side when a connection is established and eventually to other clients in the system. A goal of the database synchronizer is to minimize the cost of synchronization by reducing communication costs and delays in synchronizing the database data.

A database synchronizer in accordance with the invention facilitates computing systems which have client-side and server-side applications that share data in similar organizational structures, but which do not maintain a continuous connection to a single shared data source. The database synchronizer is a general purpose system which accommodates heterogeneous computers and databases. In general, a database synchronizer is used to share data among many nodes on the computing system. While a central (server) database includes information from all the clients, each remote (client) database is generally limited to data related to the respective client. The database synchronizer is used to synchronize the data in the central database with the data on each client's computer.

Briefly, the database synchronizer described herein performs database synchronization between a client database and a server database using a three-step process. First, the client determines what modifications to the client data have taken place since the last time of synchronization. The modifications detected are the creation of a new data item, an update to the value of an existing data item, and the deletion of a data item. Under one approach, the client detects modifications by comparing the client data with a before-image of the client data. The before-image is effectively a copy of the client data as of the last time it was synchronized. Second, the modifications are propagated to the server, which has determined what changes have taken place to the server data since the last time of synchronization. Finally, the server detects data conflicts, resolves them, and propagates modifications back to the client as refresh data.

A preferred computing system embodying the invention includes a server computer having a central database for storing data therein and any number of client computers having a remote database which includes data replicated from the central database. Both the remote database and the central database organize the data as any number of collections of data with the data being representable as row and columns. In a preferred embodiment of the invention, the databases are relational databases which organize data in tables of rows and columns of data fields. A common structure of shared columns between the server and the client is defined by an aspect of the invention called a table correspondence. A table correspondence is defined as an ordered list of the shared columns. One or more table correspondences are stored in a catalog, another aspect of the invention. Copies of the catalog are stored at the server and client.

A database synchronizer divided between at least one client and a server is used to synchronize the central database and the remote database at an arbitrary time selected by each client. The database synchronizer uses the table correspondence as a common reference between the client and server to identify the tables and columns of the databases which it is to synchronize.

The database synchronizer preferably synchronizes tabular databases between a plurality of computers. For any pair of tables to be synchronized, the database synchronizer determines which modification occurred at the client. In one approach, the modification is determined by comparing the table with a before-image of the table, taken at the time of last synchronization. There is a row modification if any column of a row in the table differs from that found in the before-image table, or if a row is present in one but not the other. Corresponding modification messages are then transmitted from the client to the server.

The server receives the modification messages and processes them to determine if the client's operation is in conflict with operations that have taken place at the server. If there is no conflict, or if the conflict is resolved in favor of the client, the server modifies the corresponding row in the tabular database at the server. Once the tabular database at the server is updated with the values from the client, the server determines refresh data to transmit to the client. The client modifies its tabular database with the refresh data to bring the two databases into synchronization.

In accordance with one aspect of the invention, synchronization costs are reduced by a message structure which minimizes the length of data messages transmitted between the client and server. In particular, modification messages are built specifying a minimal amount of information necessary to modify a row of the database on either the client or the server. Although each message includes information identifying a particular row, the message can include modification information for a plurality of columns represented in the row. The plurality of columns are preferably encoded in a single field of the message.

In accordance with another aspect of the invention, the clients and server cooperatively maintain a catalog structure on each computer. Catalogs on the client and server manifest table correspondences that list in a common, indexed order all the columns of the replicated tables on that computer. That is, a replicated column on the server and the replica column on the client have the same index value into the respective table correspondences. That index into the table correspondences is used to identify the column in messages, thereby eliminating the need to explicitly pass the column numbers between computers. The indices are passed in the modification message to identify columns having modified data.

The indices are preferably encoded into a bitmapped field in the message. Alternatively, the index values can be directly passed in the message. In a particular preferred embodiment of the invention, the decision whether to bitmap or to directly pass the indices is made dynamically on a row-by-row basis.

In accordance with yet another aspect of the invention, the client maintains two versions of a table to be synchronized. Both versions are created as identical copies at the time of synchronization. One version is actively modified by the client and contains the current values of the data fields. The other version is a before-image of the replica database created at refresh. The modifications to the database are determined by a difference comparison between the current values in the active table and the before values in the before-image table. Although the use of a beforeimage table increases the overhead at the client by as much as doubling the storage requirements, the use of two table versions enables the database synchronizer to be used with any set of tables (or other collections of data) regardless of whether the database management software, if any, provides any mechanism for automatically logging changes. Thus the database synchronizer can work with tabular data even if not maintained using database management software, e.g., spreadsheet data or columnar data stored in a text file.

In accordance with yet another aspect of the invention, the database synchronizer uses a "smart differencing" technique to minimize storage requirements of the before-image table (s). The developer specifies in the catalog which fields are not modifiable at the client. This enables the database synchronizer to omit such fields in the before-image table as long as the fields are also not used to uniquely identify a given row.

In accordance with yet another aspect of the invention, the server detects data conflicts and resolves those conflicts. The server maintains an update log of all operations on the server's replicated data since the time of last refresh for each client. For each row, and with respect to a particular client, the server iteratively processes the logged entries in the order the updates were applied to determine a server effective operation and a before value for the row. The server effective operation is a single operation which yields the same result to a client row as would the logged server entries. The before value is the value of a row at a particular client before the last propagation of a modification to that row from the client. The server effective operation and the before value are calculated from logged column values based on the logged operations and the client instigating each operation. By comparing the server effective operation and current row values with the operation propagated from the client and the calculated before-values, the server detects conflicts. The conflict is then resolved in favor of either the server or the client so proper values are stored in the server's database.

In accordance with yet another aspect of the invention, the server propagates refresh data to the client in response to a request from the client. Because columns on the server can be updated by another node without a propagation of the current value from the client, the server must calculate the current values on the client to determine the data to include in a refresh message. The server uses the server effective operation for each row to deduce the current values in the client's active database by comparing the server effective operation with the row as stored in the server database and with timestamps stored in the update log. Those deduced current values are then compared with the values in the server database. The server propagates differences to the client as refresh data.

The server thus uses the update log for two purposes. The server uses the update log to create a view of the client's old values for conflict detection and then a view of the client's current values for refreshing the client. Both views are deduced from the update log without the client providing explicit information to the server. The process is based on knowing what a client's values are at the last refresh time and recreating client update activity from update operations performed by that client since that time. Consequently, the server can perform conflict detection and can formulate the effective database operations needed to bring the client into synchronization with the server while minimizing the amount of information communicated to the server by the client.

Communication errors or errors at either client or server can result in tables that are not properly synchronized. For the greatest reliability, proper synchronization should be frequently verified. The verification must perform well even on clients with slow disks and CPUs. To facilitate this verification, the server calculates a checksum value for the client from the server's view of the client table. The server then sends that calculated server checksum to the client. For the data to be valid, a checksum performed on the refreshed client table by the client must match the calculated server checksum. Preferably, the client calculates the client checksum from a before-image of the client table. That before-image is stored immediately after the refresh and the calculation of the client checksum is performed during the client propagation processing, instead of immediately after the refresh. Thus the client risks the use of invalid data. That risk, however, is exchanged for more efficient processing.

A preferred database synchronizer in accordance with the invention also facilitates two-way filtering between the client and server. That is, both the client and the server can apply filters to the data in the respective database tables. Preferably, both row (horizontal) and column (vertical) filters can be used in the database synchronizer. This allows users to maintain private data, including rows or columns on either the client or server, which is not shared between databases.

BRIEF DESCRIPTION OF THE DRAWINGS

The above and other features of the invention, including various novel details of construction and combination of parts, will now be more particularly described with reference to the accompanying drawings and pointed out in the claims. It will be understood that the particular database synchronizer embodying the invention is shown by way of illustration only and not as a limitation of the invention. The principles and features of this invention may be employed in varied and numerous embodiments without departing from the scope of the invention.

FIGS. 5A and 5B are flowcharts illustrating the major steps for performing a server database synchronization in accordance with the invention.

FIGS. 6A and 6B are flowcharts illustrating the major steps for performing a client database synchronization in accordance with the invention.

FIGS. 8A and 8B are schematic diagrams illustrating an exemplary client database and central database, respectively.

FIGS. 9A and 9B are schematic diagrams of a table view of a replicated server-side and client-side database table, respectively.

FIGS. 10A and 10B are schematic diagrams of the client-side catalog and before-image log table, respectively, for the server table of FIG. 9A.

FIGS. 11A, 11B and 11C are schematic diagrams of the server-side catalog, server update log table, and refresh table for the server table of FIG. 9B.

FIGS. 12A and 12B are schematic diagrams of a modified server table and a corresponding server update log table.

FIG. 13 is a schematic diagram of a modified client table.

FIGS. 15A and 15B are schematic diagrams of an updated server table and an updated server update log table, respectively.

FIGS. 17A and 17B are schematic diagrams of a refreshed client table and the corresponding before-image log table, respectively, after applying the refresh data of FIGS. 16A and 16B.

FIG. 18 is a schematic diagram of an updated refresh table after the refresh of FIG. 17A.

FIG. 19A–19B are logic tables illustrating the use of a server effective operation during the database synchronization of FIGS. 8A–18.

DETAILED DESCRIPTION OF PREFERRED EMBODIMENTS OF THE INVENTION

A database is, in general, a collection of data and software programs to manipulate the data. The database maintains data through arbitrary modification operations, such as insert, update and delete operations. Two types of databases in common use are object-oriented and relational databases. A preferred embodiment of the invention is described herein as a synchronizer for a relational database.

Figure 1:
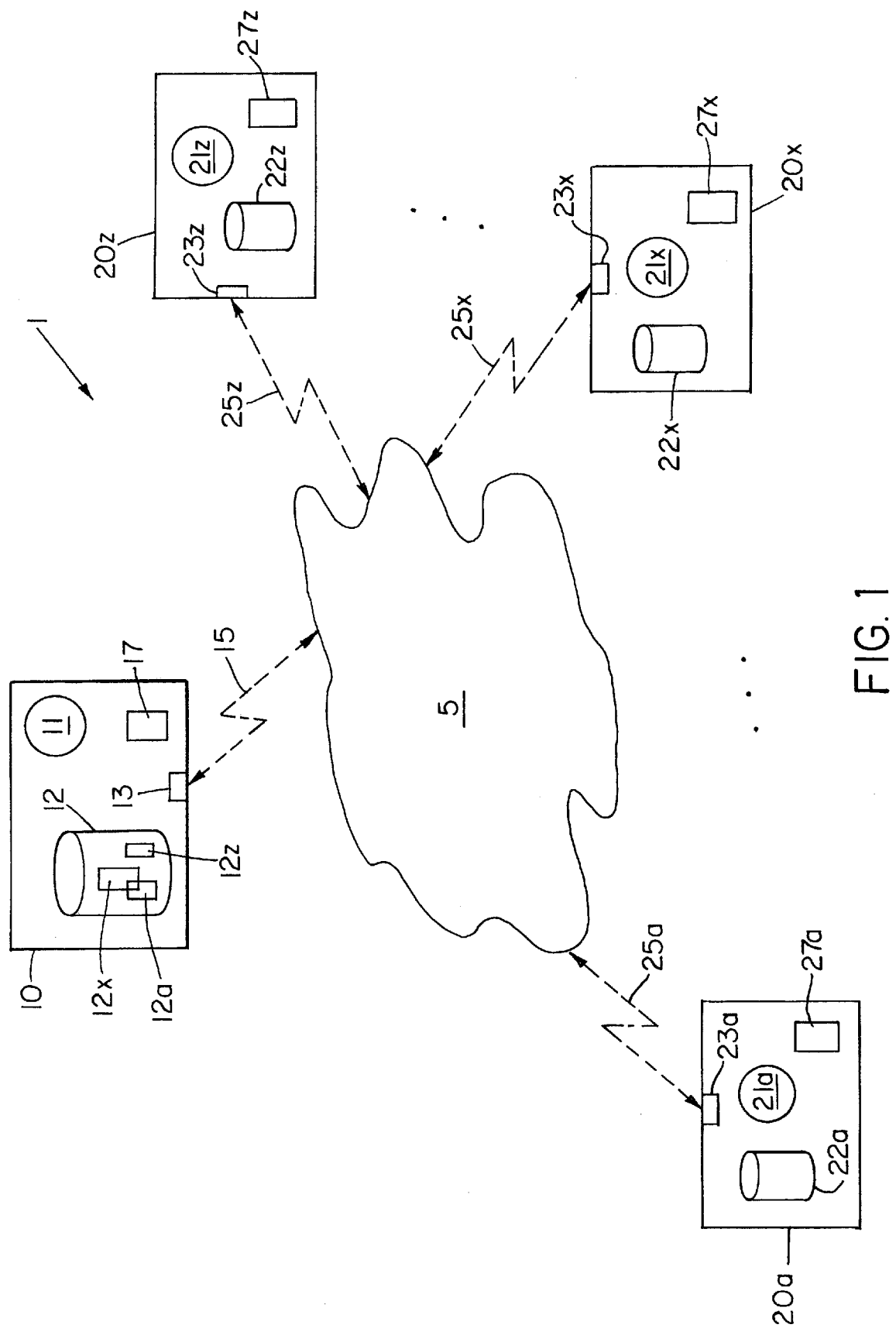
FIG. 1 is a schematic block diagram of a client-server database system in accordance with the invention.

FIG. 1 is a schematic block diagram of a client-server database system in accordance with the invention. As illustrated, there is a server node 10 and a plurality of client nodes 20a, . . . , 20x, . . . , 20z, each of which having a unique node identifier a, . . . , x, . . . , z. The server node 10 includes at least one processing core 11 comprising a processor and memory for accessing and maintaining a central database 12. Preferably, the central database 12 is a relational database such as, for example, Oracle 7 available from Oracle Corporation.

Each client node 20a, . . . , 20x, . . . , 20z can be a desktop or portable computer, each having at least one processing core 21a, . . . , 21x, . . . , 21z which can include a processor and memory. Each client node 20a, . . . , 20x, . . . , 20z accesses and maintains a respective local replicated database 22a, . . . , 22x, . . . , 22z, each of which is replicated from the central database 12. As such, each of the client local databases 22a, . . . , 22x, . . . , 22z corresponds to a respective subset 12a, . . . , 12x, . . . , 12z of the central database 12.

As illustrated, server database subsets 12a, 12x can overlap so that an individual data element in the server database 12 can be present at a plurality of client databases 22a, 22x. Each of the client local databases 22a, . . . , 22x, . . . , 22z can also include additional data fields which are not related to data fields in the central database 12.

In a particular preferred embodiment of the invention, the client-side databases 22a, . . . , 22x, . . . , 22z include tabular data which conforms to the Open Database Connectivity (ODBC) standard. Examples of suitable commercial products include database products such as Microsoft Access, Watcom SQL, and Personal Oracle and spreadsheet products such as Microsoft Excel. Other tabular data storage structures can also be used at the client.

The server node 10 can preferably store data for all clients and support multiple simultaneous users, e.g., a mainframe computer or computer cluster. The client nodes 20 are preferably autonomous personal computers, such as laptop or hand-held computers, which intermittently communicate with the server node 10 through a communications network 5, such as the telephone network. In general, although not required, the databases on the server and clients are heterogeneous. As such the server cannot generally control the database semantics and operations at the clients. Furthermore, the server cannot rely on a knowledge of the database logic at the clients.

As illustrated, each of the client nodes 20a, . . . , 20x, . . . , 20z can establish a respective communication link 25a, . . . , 25x, . . . , 25z with the communications network 5, which is linked to the server node 10 through a communications link 15. The communications links 15, 25 can be analog or digital links. To that end, each node includes a respective data transceiver 13, 23 such as an analog modem, a cellular modem, a digital (e.g., ISDN) modem, or an infrared (IR) transceiver.

Over time, the central database 12 can be modified by users to insert, update and delete rows, columns and data fields. These modifications to the central database 12 can be accomplished by users at the server or by users at one or more of the client nodes 20. Similarly, a user at a particular client node 20x can also modify the client local database 22x over time by inserting, updating and deleting data fields. Because the client nodes 20 are typically disconnected from the server node 10, corresponding data fields in the client databases 22 and the central database 12 tend to diverge over time.

In general, only some of the data at the client and server change over a period of time. The prior art approach of propagating all data is therefore inefficient because data which has not been modified is transmitted to the server or the client. Where the replicated databases are large, such an overhead noticeably slows down the synchronization process. Further, the synchronization process must often occur over communications channels that are sufficiently slow that transmitting more than the needed data imposes a hardship on users.

The divergent data makes it difficult for the clients and server to share data. That problem can be addressed by an ad hoc solution on the client-server network. Such solutions, however, are time consuming to develop, difficult to master, non-general in purpose, and suffer from various reliability problems due to poor error recovery.

A solution is therefore needed that minimizes the synchronization overhead. That task is made difficult because the client-server platforms and databases are usually heterogeneous. Adding to the challenge, the database structures at client and server are, in general, different. Also, many application situations allow for the same data item to be updated at multiple sites. In those applications, such occurrences must be detected and handled on an exception basis so the data values do not diverge.

A database synchronizer in accordance with the invention solves the prior art problem by defining a general purpose database synchronization model in which a database developer provides a non-procedural description of the desired synchronization semantics. The description is compiled, the needed information is stored at the server and each client, and the synchronization run-time routines executing at both client and server synchronize the data based on the compiled description.

A preferred embodiment of the invention provides for a synchronization system which brings the client local database $22x$ into synchronization with the central database 12. To facilitate the synchronization, a database synchronizer 17, 27 comprising programming instructions and data is resident on the server node 10 and client nodes 20, respectively. During the synchronization process, database modifications are propagated in both directions and conflicts are detected and resolved so that data can be shared among a plurality of nodes. The synchronization does not, in general, cause corresponding tables to become identical, because not all columns of the corresponding tables are replicated and some rows may be excluded from the synchronization process by filters.

A goal of a database synchronizer in accordance with the invention is to minimize the cost of synchronization by reducing communication costs and delays in synchronizing the databases. The database synchronizer is thus most effective where the ratio of updated to non-updated data is normally small. In addition, the database synchronizer is efficient over relatively slow communication channels, such as wireless connections, because minimal data is transferred between the clients and the server.

A database synchronizer in accordance with the invention manages replicated tabular data among a plurality of heterogeneous computers that are usually disconnected from each other. The tabular data is preferably synchronized on a pertable basis where the replica may be a horizontal or a vertical subset of the source data. Preferably, transaction groups can be defined which assure that synchronization of a group of tables is treated as an atomic unit of work.

Figure 2:
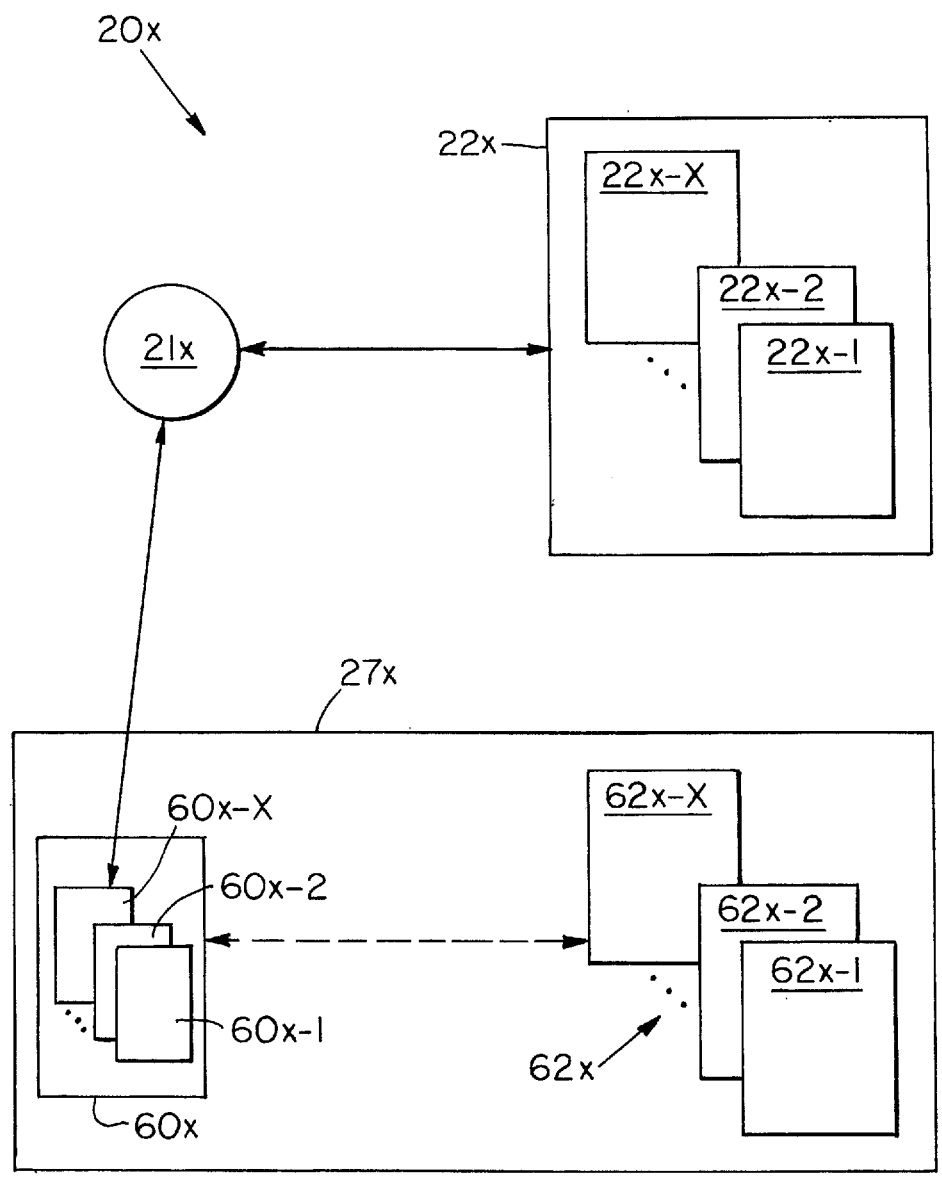
FIG. 2 is a schematic block diagram of a client node having a client-side database synchronizer embodying the invention.

FIG. 2 is a schematic block diagram of a client node $20x$ having a client-side database synchronizer embodying the invention. As illustrated in FIG. 1, the client node $20x$ includes a processing core $21x$, a local database $22x$ and a client-side database synchronizer $27x$. The local database $22x$ includes a plurality of data tables $22x$-1, . . . , $22x$-X. Although three tables are illustrated, it will be understood that the local database $22x$ can include as few as one table or many more tables. The client-side database synchronizer $27x$ comprises a client catalog structure $60x$ containing table correspondences $60x$-1, . . . , $60x$-X and before-image logs $62x$-1, . . . , $62x$-X for each table $22x$-1, . . . , $22x$-X. Each table correspondence $60x$-1, . . . , $60x$-X includes an ordered, sequential listing of all of the replicated columns in each of the tables $22x$-1, . . . , $22x$-X of the local database $22x$. Each before-image log $62x$-1, . . . , $62x$-X corresponds to the last synchronized values of the replicated columns in respective tables $22x$-1, . . . , $22x$-X, of the local database $22x$.

Figure 3:
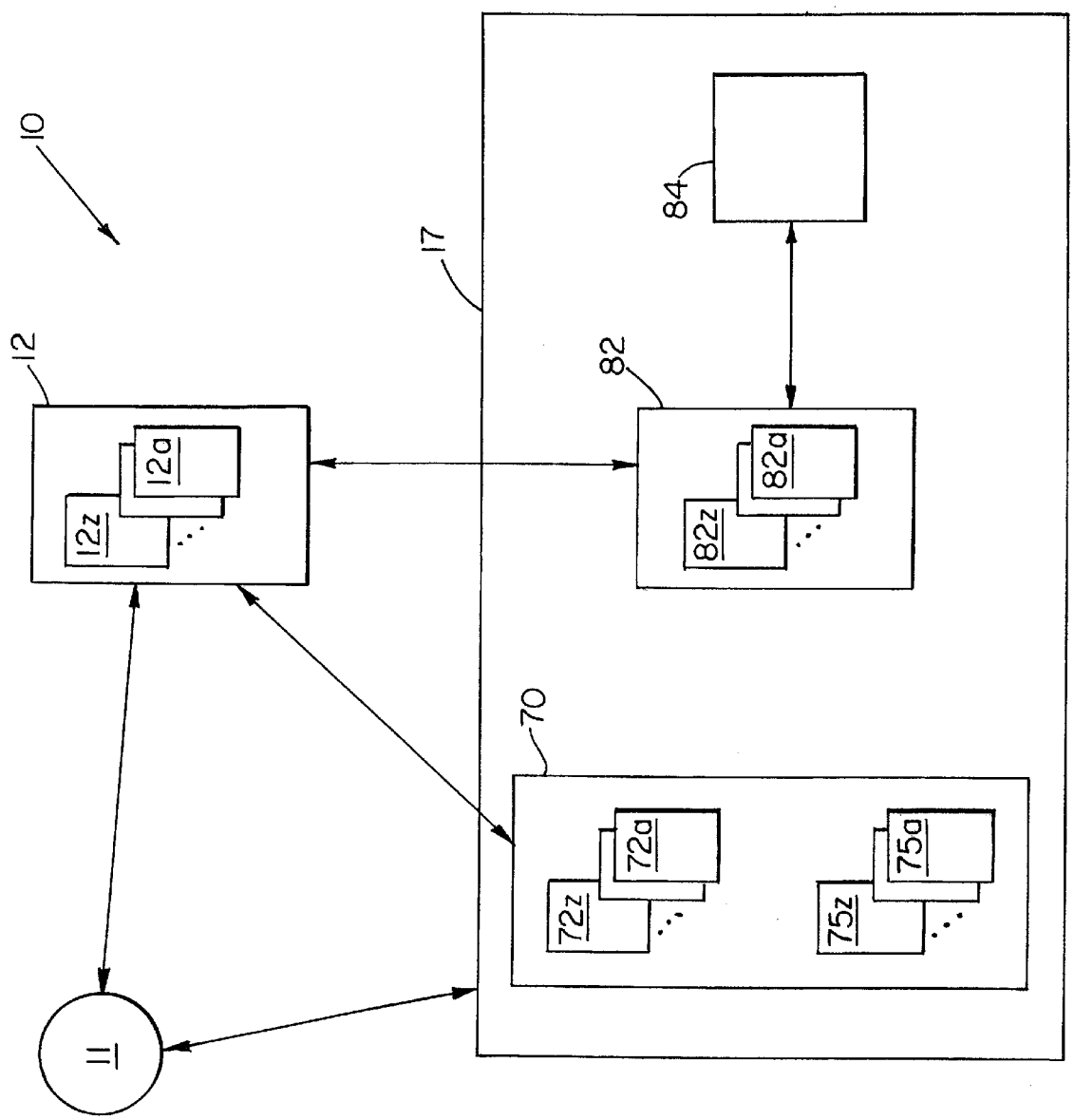
FIG. 3 is a schematic block diagram of a server having a server-side database synchronizer embodying the invention.

FIG. 3 is a schematic block diagram of a server having a server-side database synchronizer 17 embodying the invention. As described above, the server node 10 includes a processing core 11 and a central database 12. In addition to communicating with the central database 12, the processor 11 communicates with the server-side database synchronizer 17.

The server-side database synchronizer 17 includes a server catalog structure 70, a server update log 82, and a last confirmed refresh table 84. The central database 12 is divided into replicated tables $12a$, . . . , $12x$, . . . , $12z$. The server catalog structure 70 includes a table correspondence $72a$, $72x$, $72z$ for each replicated table $12a$, . . . , $12x$, . . . , $12z$. The server catalog structure 70 also includes entries $75a$, . . . , $75x$, . . . , $75z$ corresponding to, and having information about, client nodes $20a$, . . . , $20x$, . . . , $20z$. There is one server update log (SUL) $82a$, $82x$, $82z$ per table replicated from the central database 12. There is preferably one refresh table 84 for all data tables $12a$, $12x$, $12z$.

Figure 4:
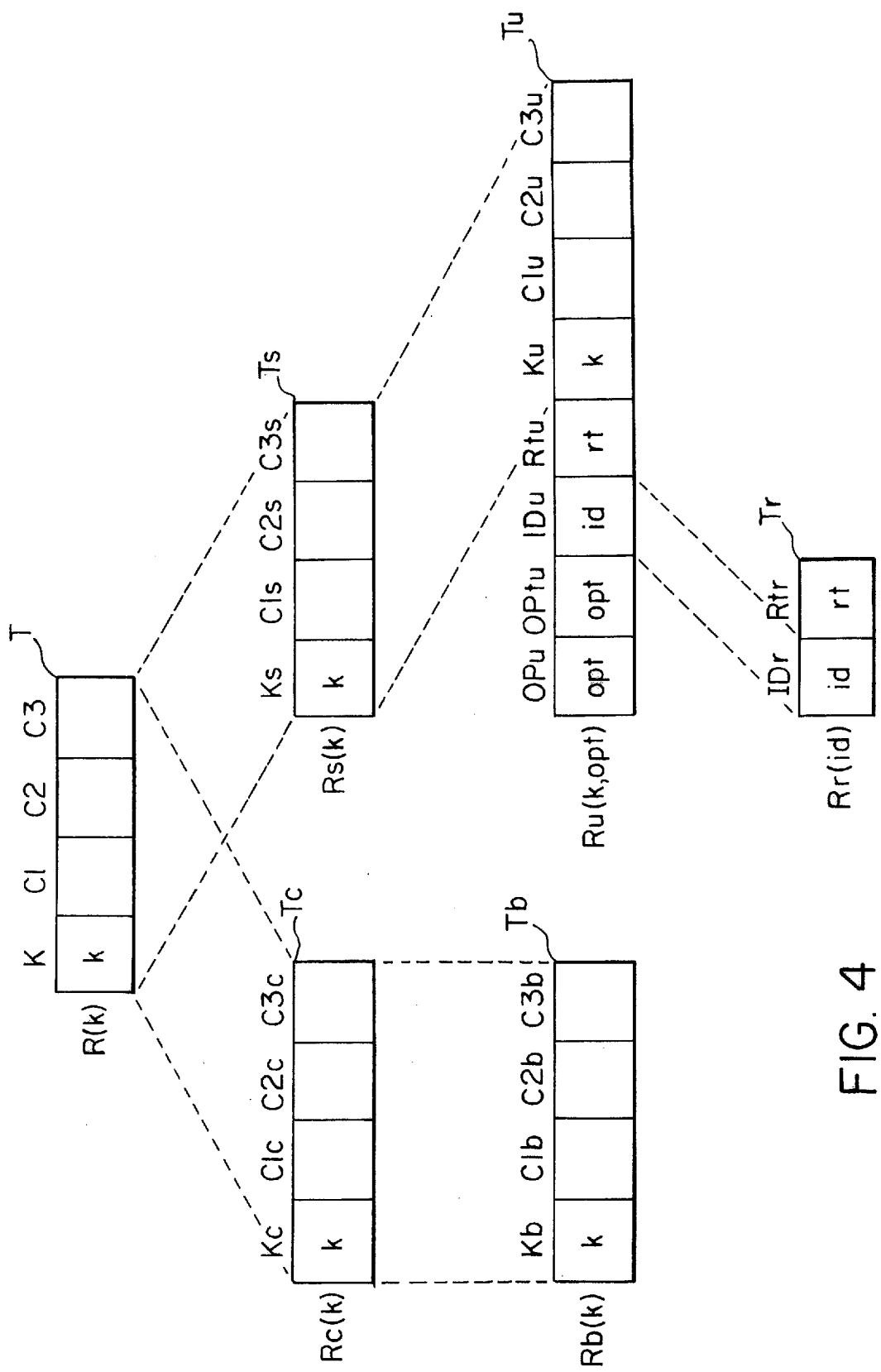
FIG. 4 is a schematic diagram of database table schemas implemented on the server node and a particular client node of FIG. 1.

FIG. 4 is a schematic diagram of database table schemas implemented on the server node 10 and a particular client node $20x$ of FIG. 1. In the figure, columns which are commonly represented between multiple table schemas are indicated by the areas within the dashed lines.

As illustrated, there is a table correspondence T which defines a key column K and non-key columns C1, C2, C3. The table correspondence T is maintained on the server node 10 and propagated to at least one client node 20. On the server, the table correspondence T refers to a server table Ts with columns Ks, C1s, C2s, C3s. On a client, the table correspondence T refers to a client table Tc with columns Kc, C1c, C2c, C3c. The tables contain rows Rs, Rc selected by a unique key value k stored in the key column Ks, Kc (i.e. Rs(k), Rc(k)). Although the key columns Ks, Kc are illustrated as single columns, the actual key may include multiple columns of information, such as a client tag and a sequential counter, which together uniquely identify the row in the tables. Each table Ts, Tc is, in general, a subset of data stored in the server database 12 and the client database $22x$, respectively.

The client $20x$ includes a before-image log table Tb having rows Rb(k) and non-key columns C1b, C2b, C3b. The value of the unique key value is stored in a key column Kb. The before-image log table Tb stores the last synchronized data values for the client table Ts in the non-key columns C1b, C2b, C3b. FIG. 4 illustrates a case where all non-key columns are mutable.

The server 10 includes a server update log (SUL) table Tu having rows Ru(k,opt) and non-key columns C1u, C2u, C3u. Each row is identified by the value of the unique key value k, which is stored in a key column Ku, and an ascendingly ordered operation timestamp (opt) for each key. The SUL table Tu records operations that have occurred for the server table Ts. The recorded information is maintained for each row of the server table Ts and includes an operation value (op) stored in an operation column OPu, the operation timestamp (opt) for the operation stored in an operation timestamp column OPtu, the numeric identifier (id) of the node which performed the operation stored in an identification column IDu, a refresh timestamp (rt) stored in a refresh timestamp column (Rtu), and the values of the replicated non-key columns C1u, C2u, C3u of the server table Ts. The numeric identifier (id) is null if the modification on the server table Ts was not performed as the result of an operation propagated by a client node. The refresh timestamp (rt) is initially null and is updated during the client refresh process, as described below.

In addition, a refresh table Tr is maintained on the server 10. Each row of the refresh table Tr identifies a client C and server table Ts, and records the time of the last refresh (rt) of the refresh table by the client C.

FIGS. 5A and 5B are flowcharts illustrating the major steps by which the client sends messages about database modifications to the server, and the server processes those messages, in accordance with the invention. A client source routine 100 is illustrated in FIG. 5A and a server destination routine 200 is illustrated in FIG. 5B. A basic assumption for these figures is that the client and server were in synchronization following the last refresh.

Referring to FIG. 5A, the server database synchronization is initiated by a particular source client node 20x. The client propagates modifications of the client table Tc to the server by determining what has changed in the client table Tc since the last time modifications were propagated for the client table Tc. At step 105 the client adds each row of the before-image log table Tb to a checksum that is accumulated for later use. The source client node 20x does a row comparison between the client table Tc and the associated before-image log table Tb by querying each table at step 110. If there is a difference (step 115), then there has been an insertion, an update or a deletion of data fields in the row.

The use of a before-image is only one way of detecting modifications at the client. The client can use one of many other methods for determining the modifications since the last synchronization. These other methods can include, but are not limited to, DBMS logging and application logging to create a client update log table similar to the server update log table Tu. To be general purpose and compatible with heterogeneous database products, the database synchronizer requires a general purpose technique. Because many commercially available client database products currently lack logging capabilities, a preferred embodiment of the invention employs the before-image technique.

At step 120, the client node 20x builds a table row message to be transmitted to the destination server node 10. For each changed row Rc(k) of the client table Tc, the client sends a message to the server describing an operation, which can be an insert (I), an update (U) or a delete (D) operation. When using the before image change detection technique, it is assumed that for any row Rc(k), the client sends at most one message per update propagation. For any operation, the client sends the value(s) of the key column(s). For a deletion, no further information is sent about the row Rc(k). For an insertion, the client must send values of all non-key columns. For an update, the client must send new values of all updated non-key columns. The client does not send values for columns that have not been modified. At step 125, the client uses the update operation to update before-image table Tb, making that row of the before-image table Tb identical to the corresponding row of the client table Tc. At step 130, the client node sends the table row message it has built to the server node 10.

The database modifications included in the table row message can be filtered at the client node 20x to keep rows or columns of information in the client database 22x private to the particular client node 20x. Column and row filtering is accomplished when constructing each query on the client table Tc and the before-image log table Tb. For column filtering, only those columns specified as being updatable in the column list of the catalog table correspondence entry 60x are included in the query's selection. For row filtering, the filter predicate is included for restricting row selection. If there are more rows to be compared in the client table Tc (step 135), then processing returns to step 105.

As the before-image log table Tb is scanned for the above modification comparison, the values of the data fields are passed to the checksum routine (step 105). Once the modification comparison is complete, the calculated checksum is compared at step 140 with a stored checksum transmitted from the server node 10 after the last refresh (described in detail below). If the data used by the client since the last refresh is valid, then the two checksum value must agree (step 145) and synchronization can proceed. In this case the client sends a commit message to the server (step 150). Otherwise, a corrupt state has been detected and an error message is sent to the server (step 155).

Turning to FIG. 5B, the server node 10 receives the table row message from the client node at step 205. At step 210, the server node performs a conflict check. When the server processes the modifications in the table row messages sent by the client, the server may detect that a conflict has occurred. Broadly speaking, a conflict occurs on a row when one or more data fields (columns) of the row change on both the client node 20x and the server node 10. In practical terms, the client node 20x and server node 10 have changed the same piece of data—a given data field in a given row—to different values since the last time they were synchronized.

A conflict on a row R(k) exists if either of the following situations have occurred since the last refresh:

1. The row on the server Rs(k) and the corresponding row on the client Rc(k) have been separately updated to different values, even if the updated columns are disjoint. For example:
   a. The same column at the server and the client can both change to different values. This results in a direct column conflict that must be settled by selecting one value and discarding the other.
   b. Different columns can change at the server and client. This results in a conflict that can be resolved without discarding either value.
2. A row R(k) has been updated in one place (client or server) and deleted in the other. In effect, each updated column of the row that still exists is in conflict with the non-existent column of the non-existent row in the other location.
3. A row Rk) did not exist at the time of the last refresh and row R(k) has since been inserted (and possibly updated) in both places and the server row Rs(k) is not equal to the corresponding client row Rc(k).

If a conflict is detected (step 215), then the server node 10 performs processing steps to resolve the conflict at step 220. When a conflict has been detected, it must be resolved if the tables are to return to a synchronized state. During conflict resolution, a detected conflict is resolved in favor of the client or server, depending on information stored in a table correspondence, which is preferably defined for each table in the server catalog 70. If the conflict cannot be resolved in this automatic fashion, it must be resolved manually.

In a preferred embodiment of the invention, the server node 10 weighs in favor of either the current value in the central database 12 or the updated value from the updating client node 20x. For specific data fields, the server node 10 can resolve database conflicts in favor of some client nodes but not other client nodes. Further details of the conflict resolution process are described below.

If the conflict is resolved in favor of the client (step 225) or if there is no conflict, then at step 230, the server node 10 modifies data in the central database 12, and a record of the client's operation, including the client's numeric identifier, is added to the server update log at step 235. For additional rows (step 240), processing returns to step 210.

FIGS. 6A and 6B are flowcharts illustrating the major steps by which the server computes and sends table modification messages to the client in accordance with the invention. This is called "refreshing the client." A client destination routine 300 is illustrated in FIG. 6A and a server source routine 400 is illustrated in FIG. 6B.

Client database synchronization is initiated by the destination client node 20x, at step 305 of FIG. 6A, where a table refresh request message is transmitted to the source server node 10. The table refresh request message is received by the server node 10 at step 405 of FIG. 6B. The server node 10, at step 410, determines the refresh data to return to the client node 20x by querying the server update log table Tu. As the refresh data is determined for each row, a table row refresh message is built at step 420. At step 425, the table row refresh message for the replica database is transmitted to the client node 20x. If there are more unique rows in the SUL query result at step 430, then processing returns to step 415. As above, only the data field values to be updated at the client node 20x are transmitted.

At step 435, the server calculates a checksum value and sends it to the client. The checksum is calculated on the rows of the server table Ts after applying the client filter and excluding columns not replicated at the client. The server also transmits a refresh timestamp to the client in this message.

Returning to FIG. 6A, each table row refresh message from the server node 10 is received by the client node 20x at step 310. For each row R(k) received from the server 10, the corresponding row Rc(k) of the client table Tc is updated at step 315. The before-image log table Tb is updated at step 320, making that row of the before-image log table Tb identical to the corresponding row of the client table Tc. If more table row refresh messages are available at step 325, then processing returns to step 310. Otherwise, processing continues to step 330, where the server checksum value and timestamp are received, and then to step 335, where the table checksum value from the server node 10 is stored for later use by the client node 20x to validate the working data in the client table Tc.

At step 340, the client node 20x transmits a refresh acknowledgment message to the server node 10 to acknowledge a successful refresh. The refresh acknowledgment message includes the refresh timestamp received by the client at step 330. The client node 20x may, however, accept or reject the refresh data from the server node 10. The client node 20x is now free to disconnect from the server 10 or to process additional tables.

Returning to FIG. 6B, the refresh acknowledgment message is received by the server node 10 at step 440. At step 445, the refresh table Tr is updated with the received timestamp.

Generally, but not necessarily, the client node 20x executes a script which propagates its modifications to the server node 10 for a given table before requesting that the server node refresh that table. It is possible for the client to propagate its modifications without requesting a refresh. However, for any refresh messages to be applied to the client table Tc, the client table Tc and the before-image log table Tb must have identical data. This implies that all current updates for a table T must be propagated to the server before a refresh request can be sent. Furthermore, refresh messages cannot be applied at the client for table T if any modifications had been made to the client table Tc since that last propagate.

In the simple case, the client requests a refresh on the client table Tc immediately following each propagation of modifications for the client table Tc; thus, the time of last propagation coincides with the time of last synchronization. However, the client may propagate modifications without requesting a refresh. The server conflict detection algorithm takes this possibility into account.

For various reasons, the client table Tc and the server table Ts may not get correctly synchronized. Erroneous synchronization can be caused by misuse of internal tables, misuse of internal control constructs (e.g., triggers), or simple corruption of data. The situation can also occur due to bugs in the synchronization software. When this happens, the users are notified so the problem can be corrected and so that data does not diverge further.

In cases where the amount of data is large compared to the bandwidth of the connection between the two nodes, checking collections of data to determine whether they are identical is typically done by generating checksums at both sites and comparing the checksum values. If the checksum values are different, there is a problem. If the checksum values are the same, the data is probably the same because the probability of a false negative is very low where an appropriate checksum algorithm is used. A checksum comparison technique is preferable to performing a full comparison of the data because the latter requires that all data be copied from one node to the other where the full comparison can take place. Because of the bandwidth, which may be very low relative to the amount of data to be compared, e.g., if a wireless modem is used, and the usually slow speed of the client node, which may use a slow hard drive driven by a slow CPU, checksum techniques are more appropriate than full comparisons.

Although users should validate the synchronization frequently (ideally every time a table refresh operation is done), they may not do the validation unless the overhead is very low, especially at a slow client where performing an extra checksum generation pass over the data can impose an unacceptable overhead for many users who may, therefore, simply not validate the synchronization.

To minimize the number of passes over the data, the checksum calculations are preferably performed when the database synchronizer is reading data anyway (as part of the normal synchronization process). The normal process for synchronizing a client table Tc and a server table Ts uses a three-step process. First, software at the client determines what updates to the client table Tc have taken place since the last refresh. The client does this by comparing the client table Tc with the before-image table Tb. The before-image table Tb is effectively a copy of the table as of the last time it was synchronized. Second, the updates are propagated to the server, which has determined what changes have taken place to the server table Ts since the last refresh. Finally, the server detects update conflicts, resolves them, and propagates updates back to the client as refresh data. It is only at this time, immediately after the completion of synchronization, that the tables are consistent; that is, the value of shared data at the server when it completes transmitting refresh messages should be identical to the value of shared data at the client immediately after it completes processing of the refresh messages.

At first, one might believe that the client-side checksum can be efficiently derived during the first step data pass, passing the already-read data from the client table Tc to the checksum routine. Unfortunately, this does not work because the data in the client table Tc can be further updated as part of the synchronization process. Instead it would be logical to calculate the checksum immediately after the refresh, but this has the disadvantage that it requires an extra pass over the client table Tc, substantially increasing the time it takes to perform synchronization processing at the client.

Instead of generating a checksum from the client table Tc, a checksum is generated from the before-image table Tb. As described above, the first step at the client includes scanning all before-values anyway (to determine what changed).

Each value from the before-image table Tb is then passed to the checksum routine as it is being read. The result is a checksum that should match what the server data looked like immediately following the previous refresh pass.

As part of each refresh pass, the server sends a checksum for its replica of the data. The client saves the checksum value and uses it the next time it is scanning the before-image table (for a refresh or propagate updates operation). If the checksums do not match, the server is notified, the modification messages generated during the first step are discarded, and the client is marked and disabled to await intervention. Thus, an extra pass over the client data is avoided.

At the cost of the extra pass, it is possible to notify the client of inconsistencies immediately upon completion of the synchronization, rather than "late notification" resulting from waiting until initiating the next synchronization. However, the approach of detecting the problem during the next synchronization process is not harmful to the database because it does not result in the loss of any information. There is still sufficient information to determine the contents of the non-matching client and server tables. It is true that some additional updates may have taken place at the client or server, but these are all identified and available for reconstructing the desired matching state. Indeed, even if the less efficient (extra pass) algorithm were used in which the client checksum was computed immediately after the refresh, it is generally the case that further updates have occurred at the server. Essentially, there is no way to prevent updates at the server following synchronization (i.e., there is no way to prevent some degree of "late notification") in any event.

Figure 7:
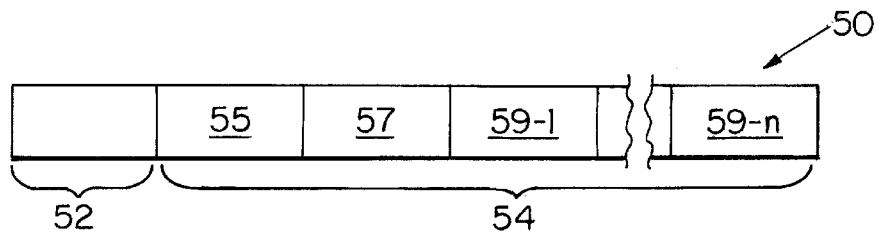
FIG. 7 is a schematic diagram of a table row message.

FIG. 7 is a schematic diagram of a table row message. The table row message 50 includes a message header 52 and a body 54. The header 52 contains the message code which identifies the message as either an insert, an update or a delete operation. The body 54 preferably includes a key field 55 for the unique key value identifying the table row in a relational database, a column identification field 57 for identifying the column(s) at which the modified data field(s) reside(s) and a stream of data values 59 which are the modified data values from the replicated database 22x. Each updated value occupies a respective subfield of the stream 59. There is a separate message for each modified row and each field in the message is preferably byte-aligned. A compression algorithm can be used during transmission of the message to further reduce the length of the message and thus the connect time.

The data values 59-1, . . . , 59-n can be the actual new values of the updated data fields; compressed representations of these values; or instructions, such as edit strings, for converting the old values to the new values. The mechanism of transmitting the values can be selected on a column-by-column basis.

The column identification field 57 can be implemented using a bit-map or a stream of index values. The choice as to which to implement depends on the total number of columns in the table and the number of updated columns. These factors contribute to the overhead of sending the identifying information.

The decision as to which method of identifying the columns to use is preferably done dynamically, based on the message being sent. For simplicity, however, a choice can be made based on the nature of the tables being replicated. In general, the bitmap method is more appropriate where at least $\frac{1}{8}$th (rounded up) of the total number of columns are updated. The bitmap method is always more appropriate where the table has 8 or fewer columns. By dynamically choosing an identification method, each message can be built having the minimum number of 8-bit bytes necessary for communicating the message semantic.

As illustrated there are n subfields of data values indicated by reference numerals 59-1, . . . , 59-n. The size of each subfield in the stream 59 is determined by the type of data stored at the respective position in the replicated database table 22x. In the preferred embodiment of the invention, the table row message 50 indicates individual data fields in the replicated row of the database table 22x and each subfield of the data stream 59 corresponds to the modified value of the indicated data field. It is important to note that only the current values of inserted or updated data fields are transmitted from a client to a server. Previous values are never sent.

The following lists the messages preferably used to implement the database synchronizer's communication protocol between the client and server nodes:

Begin-Task
End-Task
Begin-Transaction-Group
End-Transaction-Group
Insert
Update
Delete
Table-Refresh-Request
Full-Table-Refresh-Request
Begin-Table-Refresh
End-Table-Refresh
Task-Complete
Error
Client-Refreshed The steps in a synchronization are described by a sequence of operations called a task. The following grammar describes the message protocol of messages transmitted from the client to server. In the grammar, items which are not enclosed in angle brackets (<>) represent messages.
<task> ::=Begin-Task <task_body> End-Task
<task_body> ::=<task_element_list>
<task_element_list> ::=<task_element> <task_element_list>
<task_element_list> ::=<null>
<task_element> ::=<table operation_list>
<task_element> ::=<transaction_group>
<table_operation_list> ::=<tab_op_list> <refresh_request>
<tab_op_list> ::=<tab_op> <tab_op_list>
<tab_op_list> ::=<null>
<tab_op> ::=<row_op>
<tab_op> ::=Commit
<row_op> ::=Insert
<row_op> ::=Update
<row_op> ::=Delete
<refresh_request> ::=Table-Refresh-Request
<refresh_request> ::=<null>
<transaction_group> ::=Begin-Transaction-Group <transaction_body> End-Transaction-Group
<transaction_body> ::=<trans_op_list> <refresh_req_list>
<trans_op_list> ::=<row_op> <trans_op_list>
<trans_op_list> ::=Commit
<refresh_req_list> ::=<ref_req_list>
<refresh_req_list> ::=<null>
<ref_req_list> ::=Table-Refresh-Request <ref_req_list>
<ref_req_list> ::=Commit Similarly, the message protocol for messages sent from the server to the client for refreshing the client is as follows:
<task_refresh> ::=<refresh_list> Task-Complete
<refresh_list> ::=<refresh_transaction> <refresh_list>
<refresh_list> ::=<null>
<refresh_transaction> ::=<table_refresh_list> Commit
<table_refresh_list> ::=<table_refresh> <table_refresh_list>
<table_refresh_list> ::=<null>
<table_refresh> ::=Begin-Table-Refresh <ref_op_list> End-Table-Refresh
<ref_op_list> ::=<row_op> <ref_op_list>
<ref_op_list> ::=<null>

Error messages can occur at any time and are handled in context. They are used to communicate an error situation at either the client or server and trigger the appropriate error recovery.

The Insert, Update, and Delete messages communicate data modifications. The Commit message is used to indicate transactional semantics. The Table-Refresh-Request message causes the server to synchronize the indicated table at the requesting client. All other messages are used for context and sequencing error checks.

EXAMPLE

FIGS. 8A and 8B are schematic diagrams illustrating table 12a in a central database 12 and an exemplary table 22x-a in a client database 22x, respectively. The central database 12 and the client database 22x include tables organized in rows and columns of data fields, which are initially synchronized as shown. The values of the non-key data fields are illustrated by reference characters A–V. Also shown are the key columns $K_{12}$, $K_{22}$ and the unique key values stored therein.

As illustrated, the first row $R1_{22}$ of the client table 22x-a is a replicated subset of the first row $R1_{12}$ of the central database table 12a. The second row $R2_{22}$ of the client table 22x-a is a replicated subset of the fourth row $R4_{12}$ of the central database table 12a. Only the first, second and fourth columns $C1_{12}$, $C2_{12}$, $C4_{12}$ of the central database table 12a are replicated to the columns $C1_{22}$, $C2_{22}$, $C3_{22}$ of the client table 22x-a. The client table 22x-a also includes a fourth column $C4_{22}$ which does not correspond to any column in the central database table 12a and a row $R3_{22}$ which does not correspond to any row in the central database table 12a.

A table correspondence entry exists in the replicated catalog 60x for each replicated table and describes the corresponding client and server tables and replicated columns. The information as to which columns are replicated is included within a table correspondence entry in the replicated catalog. Likewise, filters used to specify which rows are shared between the client and central copies of a replicated table are also included in the table correspondence entry in the catalog.

FIGS. 9A and 9B are schematic diagrams of a table view of a replicated server-side and client-side database table, respectively. As illustrated, the server table view Ts is a filtered subset of the central database table 12a. Likewise, the client table view Tc is a filtered subset of the client database table 22x-a. The table correspondence describes which columns of tables 12a and 22x-a appear in these views, and the filters in the table correspondence provide predicates that must be satisfied for rows to appear in the views.

For clarity and ease of description, only rows common to the server table Ts and the client table Tc are shown in the figures. As illustrated, both the server table Ts and the client table Tc have two common rows, each having a unique key value. In the illustrated example, the rows for key values "1" (i.e., R(1)) and "4" (i.e., R(4)) are replicated at the client.

Likewise, only columns defined by the table correspondence as being shared columns are shown in the figures. Each computing node uses table correspondences stored in its catalog to filter column data from the databases.

FIGS. 10A and 10B are schematic diagrams of the client-side catalog and before-image log table, respectively, for the server table Ts of FIG. 9A. The client-side table correspondence Lc is an ordered, sequentially-indexed list of the columns of the client table 22x-a which are replicated to the client table view Tc. The associated before-image log table Tb provides a reference from which changes to the client database table Tc are measured. As an initially synchronized database, the before-image log table Tb is identical to the client-side updatable columns of client table Tc of FIG. 9B.

FIGS. 11A, 11B and 11C are schematic diagrams of the server-side table correspondence Ls, server update log table Tu, and refresh table Tr for the server table Ts of FIG. 9B. The server-side table correspondence Ls is an ordered, sequentially-indexed list of the columns in the central table 12a which are replicated in the client table Tc. There is a one-to-one correspondence between the index into the server-side table correspondence Ls and the respective client-side table correspondence Lc.

The server update log table Tu for the server table Ts records information about operations that have been performed on the server table Ts. The operation column OPu can have a value representing the insert (I), update (U) or delete (D) operation. In the SUL table Tu, the values stored in the non-key columns C1u, C2u, C3u depend on the recorded operation. If the recorded operation is an update or a delete, then the values of the non-key columns contain the values from the server table Ts immediately preceding the operation (i.e., before values). If the recorded operation is an insert, the values of the non-key columns contain the values of the server table Ts immediately after applying the insert (i.e., inserted value). When the server 10 applies a client update to the server table Ts, the identifier ID is set; otherwise the identifier is not set (i.e., it is null) to indicate a modification by some means other than the server applying a client operation to the server table Ts.

As illustrated in FIG. 11B, the operations recorded on the SUL table Tu are all insertions. The operation timestamp column OPtu has time values indicating the time of insertion, t0. The client identifier column is null to indicate an insertion by other than a synchronized client. The values of the non-key columns C1u, C2u, C3u reflect the inserted values.

The refresh table Tr of FIG. 11C reflects the time at which the server table was confirmed to be refreshed by the client nodes 20. Here, the replicated client table Tc is represented as being refreshed at the client nodes $20a, \ldots, 20x, \ldots, 20z$ at times $t0_a, \ldots, t0_x, \ldots, t0_z$, which are the times at which the server table Ts and the client tables Tc were initially synchronized.

FIGS. 12A and 12B are schematic diagrams of a modified server table Ts and an updated server update log table Tu, respectively. Note that the server table Ts has been modified since the last synchronization. As illustrated, the data fields Rs(1)C1 and Rs(4)C1 of the server table Ts have changed from the initial values in FIG. 10B. As represented in the SUL table Tu, the data fields were updated by client nodes 20a and 20z, at time t1 and t2, respectively. Since these were update operations, the data fields of the SUL contain before-values A and M, not new values A' and M'.

FIG. 13 is a schematic diagram of a modified client table Tc. As illustrated, the data fields Rc(1)C1 and Rc(4)C3 of the client table Tc have changed from the values initially in FIG. 10A. At an arbitrary time t3, the client connects to the server to propagate the modifications of the client table Tc to the server.

Figure 14A:
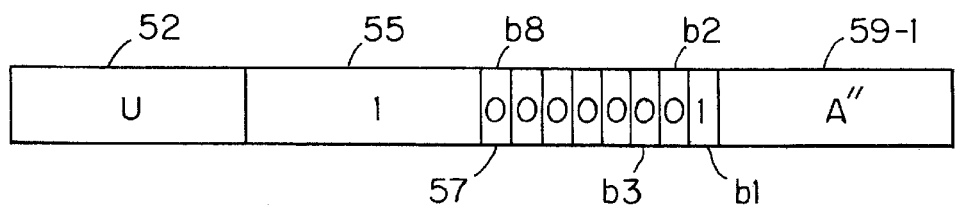
FIGS. 14A and 14B are schematic diagrams of table row messages from the client node to the server node for the modifications to the client table illustrated in FIG. 13.
Figure 14B:
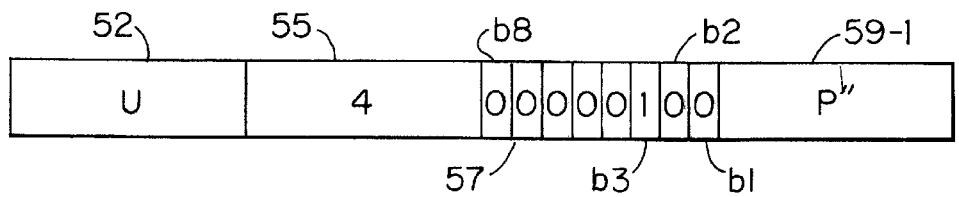

FIGS. 14A and 14B are schematic diagrams of table row messages from the client node 20x to the server node 10 for the modifications illustrated in FIG. 12A. As illustrated, the column identification field 57 is a one byte bit-mapped field because there are only three columns in the table R. Each bit b1 ... b8 represents an index position in the client-side table correspondence Lc. As illustrated, the first bit b1 of the field corresponds to the first index position in the client-side table correspondence Lc and the third bit b3 corresponds to the third index position in the client-side table correspondence Lc. Bits four through eight are not used, so they are cleared.

As illustrated in FIG. 13, the initial data field values of A and P have been updated to A" and P" respectively. Consequently, the key values for the two changed rows must be passed in the message. In FIG. 14A, the key field 55 is set to a value of "1". In FIG. 14B, the key field 55 is set to a value of "4". The first and third positions in the client-side table correspondence Lc are marked in the column identification field 57 at the first bit position b1 in FIG. 14A and the third bit position b3 in FIG. 14B. The value field 59 includes the updated values from the corresponding data fields. As illustrated, the value A" is in the first (and only) value field 59-1 in FIG. 14A and the value P" is in the first (and only) value field 59-1 in FIG. 14B.

Conflict Detection and Resolution Processing

As illustrated, there is one conflict in the databases, which is detected by the server 10 upon receipt of the update messages from client 20x. Specifically, the change to the data field R(1)C1 is in conflict with the change previously made by client 20a. The conflict is resolved at the server 10 and the central database table 12a is updated.

For a server row Rs(k), the server update log table Tu records a series of M operations (Ru(k(1 ... M),opt):op that have been carried out on that row since the last time a client was refreshed. A Server Effective Operation (SEO) is defined as the single operation that yields the same result as a series of operations on a row. For example, an insert followed by an update is effectively still an insert and an insert followed by a delete is effectively a non-operation (NoOp). A server effective operation of "NoOp" means there has been no effective operation on the row R(k). For example, if a row Rs(k) on the server was inserted, then deleted, since the last refresh, that row will never be seen by the client.

A client's before-values are its values for non-key columns of the row Rc(k) on the client at the time it last propagated an update or a delete on that row Rc(k) to the server. If a client has not propagated modifications since the last time it was refreshed, then the before values can be determined by taking column values from the first SUL entry for the row R(k) following the time of the last refresh. However, a client may propagate modifications multiple times before it is refreshed, accepting that it will be out of synchronization during this time. This fact complicates the determination of both the server effective operation and the client's before values.

The server effective operation may be affected by intermediate modification propagation. The server effective operation must be determined with respect to the client propagating the modifications. If the client sends an intermediate operation such as a delete that puts it into synchronization with the server, the server effective operation becomes a NoOp, because client and server agree at that point; if some other client sent the same operation, the server effective operation instead becomes a delete.

Similarly, intermediate modifications change the server's picture of the client's before values by showing how those values have changed since the last refresh. For example, if the client has propagated an intermediate update on a row R(k), the change in the update needs to be applied to the server's picture of the client's before values.

The server effective operation and before values are determined by selecting the SUL entries for the row R(k) since the last refresh, ascendingly ordered by the operation timestamp. A provisional-before-values (pbv) list is created that is initially empty, and a provisional Server Effective Operation (pSEO) is created that is initially NoOp. The SUL entries are then iteratively read, using Table I below to determine a new pSEO and pbv at each entry. At each iteration, the notation Ru(k(m)):cv indicates the column values in the current SUL entry; and the notation Ru(k(m+1)):cv indicates either the column values from the next SUL entry, or the column values from the server row Rs(k) if there are no more SUL entries. The column headings in Table I indicate the following:

TABLE I i) pSEO(m − 1) is the value of the provisional SEO at the start of this iteration.
ii) Ru(k(m)):op is the operation seen on this iteration.
iii) Ru(k(m)):id = "x" is "Yes" if client x (the client for which the SEO is being determined) performed the operation seen on this iteration and "No" otherwise.
iv) PSEO(m) is the value of the provisional SEO at the end of this iteration.
v) pbv(m) is the value of the provisional before-values for client "x" at the end of this iteration.

| pSEO(m − 1) | Ru(k(m)):op | Ru(k(m)):id = "x" | pSEO(m) | pbv(m) | Notes |
|---|---|---|---|---|---|
| NoOp | Insert | Yes | NoOp | Ru(k(m)):cv | |
| NoOp | Insert | No | Insert | pbv(m − 1) | No change |
| NoOp | Update | Yes | NoOp | Ru(k(m + 1)):cv | A pSEO of NoOp indicates Rs(k)==Rc(k) at the time this client does this update, so the pbv is assigned from the next SUL entry, which contains the values resulting from this update and therefore the client's values at the time it sent the update. |
| NoOp | Update | No | Update | | If this is the first SUL entry, pbv is set to Ru(k(m)):cv; otherwise, the pbv does not change. (An operation of Update or Delete means that Rc(k) existed as of the last refresh, so its initial values are in the first SUL entry following that time.) |
| NoOp | Delete | Yes | NoOp | Empty | |
| NoOp | Delete | No | Delete | | If this is the first SUL entry, pbv is set to Ru(k(m)):cv; otherwise, the pbv does not change. (An operation of Update or Delete means that Rc(k) existed as of the last refresh, so its initial values are in the first SUL entry following that time.) |
| Insert | Insert | Yes/No | Impossible | | This would indicate insertion by the client of a record that already exists, because it was inserted or updated previously. |
| Insert | Update | Yes | NoOp | Ru(k(m + 1)):cv | An insert conflict that is decided in favor of the client is implemented by updating the server's record, resulting in this entry and changing the SEO to NoOp. |
| Insert | Update | No | Insert | pbv(m − 1) | No change |
| Insert | Delete | Yes | Impossible | | This client cannot be trying to update or delete because it cannot possess the record, otherwise the pSEO would |
| Insert | Delete | No | NoOp | pbv(m − 1) | No change |
| Update | Insert | Yes/No | Impossible | | This would indicate insertion by the client of a record that already exists, because it was inserted or updated previously. |
| Update | Update | Yes | Update | pbv(m − 1) + change | If the record has been previously updated and this client is doing an update, the column(s) changed by this client must be determined and those values merged into the current pbv. |

TABLE I-continued

| | | | | | |
|---|---|---|---|---|---|
| | | | | | The changed value(s) are found by comparing $Ru(k(m)):cv$ to $Ru(k(m+1)):cv$, noting what has changed (these are the client's changes) and merging the changes into pbv. |
| Update | Update | No | Update | $pbv(m-1)$ | No change |
| Update | Delete | Yes | NoOp | Empty | |
| Update | Delete | No | Delete | $pbv(m-1)$ | No change |
| Delete | Insert | Yes | NoOp | $Ru(k(m)):cv$ | |
| Delete | Insert | No | Update | $Pbv(m-1)$ | No change. An effective Delete followed by Insert results in Update, not Insert. This is the same approach used by the client source in determining what updates to propagate; it only has the before-image and the current database, with no record of intermediate operations. |
| Delete | Update | Yes/No | Impossible | | A pSEO of Delete indicates that $Rs(k)$ does not exist, so it cannot be deleted or updated. |
| Delete | Delete | Yes/No | Impossible | | A pSEO of Delete indicates that $Rs(k)$ does not exist, so it cannot be deleted or updated. |

In a potential conflict situation, the client operation and the server effective operation determine what sort of conflict may have occurred. Table II below summarizes the possibilities. Note that three of the "impossible" situations can occur if a previous client operation (CO) is rejected due to a conflict—these are: SEO=Update, CO=Insert; SEO=Insert, CO=Update; and SEO=Insert, CO=Delete.

Conflict Resolution

When the server detects a conflict, it falls into one of three categories shown in Table II: an insert conflict, in which client and server insert the same row but with different non-key values; a delete conflict, in which one system deletes a row the other updates; and an update conflict, in which client and server update one or more corresponding

TABLE II

| Server Effective Operation | Client Operation | | |
|---|---|---|---|
| | Insert | Update | Delete |
| Insert | Insert conflict: Client and server are trying to insert the same record with different non-key values. | Impossible. | Impossible. |
| Update | Impossible. | Update conflict: Server and client are trying to update same columns of same record to different values. | Delete conflict: Client is trying to delete a record that server has updated. |
| Delete | Impossible. | Delete conflict: Server is trying to delete the same record the client is trying to update. Resolution is on row basis. | No conflict. |

Only conflicts in which columns are in direct conflict are detected. These include insert conflicts in which one or more fields of the inserted rows are different; all delete conflicts; and update conflicts in which one or more fields of the update rows have been changed to different values. It is possible, however, to detect update conflicts in which data fields are not in direct conflict, by comparing the client's before-values to all non-key data fields, not just those contained in the client update message.

data fields to different values. The catalog structure contains information on how to resolve each of these conflicts for a table correspondence.

For insert conflicts and delete conflicts, the catalog instructs the server to select either the client's operation or the server's operation, and to reject the other operation. For an insert conflict, either the client's complete row or the server's complete row is inserted. For a delete conflict, the row is either deleted, or the complete set of updates is applied.

For update conflicts, the catalog instructs the server to select either the client's value or the server's value for each individual conflicting data field. For example, the catalog can state that for columns C1 and C3, the server value prevails, but for column C2 the client value prevails.

The server uses the conflict resolution settings in the catalog to determine whether to apply the client's changes to the server table. For cases where the client operation or updated data field value prevails, the server applies the client operation or update. For cases where the server operation or updated data field prevails, the server does not apply the client operation or update. In these cases, the client table will not agree with the server table until the client is next refreshed.

When a client operation is rejected during conflict resolution, the server places special entries in the server update log so the client is sent correct instructions the next time it is refreshed. This is necessary because the server update log otherwise would not include a correct picture of the state of the client table, because it includes no record of the client's rejected operation. The special entries are identified by the identifier of the client whose operation was rejected. They are: Send-Insert (S-I), and Send-Update (S-U).

The Send-Insert entry instructs the server to send the client an insert message with the server's current values the next time the client requests a refresh. The Send-Update entry instructs the server to send the client an update message with current values for all data fields the next time the client requests a refresh. Following conflict resolution, the server inserts these entries in the server update log as described below.

For an insert conflict in which the server prevails, the server places a Send-Update entry in the server update log. The server also places a Send-Update entry when the client and server insert identical rows. If the server update log did not include this entry, the server would send the client an insert message instead of an update message, causing the client to try to insert a row that already exists and resulting in an error.

When the client deletes a row, the server updates it, and the server operation prevails, the server places a Send-Insert entry in the server update log. If the server update log did not include this entry, the server would send the client an update message instead of an insert message, causing the client to try to update a row that does not exist and resulting in an error.

When the client and server both delete the same row, it is not a conflict, but the server needs to know that the client has also deleted the row so as to not send the client a delete message. The server places a Send-Insert entry in the server update log. If, at the time of next refresh, the row does not exist in the server table, the server will send no message to the client. If on the other hand the row exists because another client has inserted it at the server, the server will send an insert message with the current row values to the client.

To assure that conflicts do not occur due to non-unique keys, any of several mechanisms can be used to assure that the row keys are unique across the computing system. As described above, a sequential key value can be tagged with the identifier of the creating computer (server or client). Alternatively, the server and the clients can each be assigned arbitrary key values or a range of key values. Other suitable techniques can also be used. The choice of which technique to use on a computing system is selected by the designer of the synchronized application.

FIGS. 15A and 15B are schematic diagrams of an updated server table Ts and an updated server update log table Tu, respectively. The update to data field Rs(4)C1 of the server table Ts is used to update the corresponding data field Rc(4)C1 of the client table Tc. As illustrated, the conflict over the data field Rs(1)C1 has been resolved in favor of the value from the server table Ts. The new entries in the server update log table Tu reflect changes to the rows of the server table Ts due to the change data propagated from the client table Tc of the client node $20x$. Because there has been no refresh of the client table Tc, the refresh table Tr of FIG. 12C is unchanged with respect to this client node $20x$.

Refresh Mechanism Processing

For each row of the server table Ts, the server determines a Client Effective Operation (CEO) to be sent to the client node $20x$ at step 415. The client effective operation is based on the client's column values at the time of the refresh request, the server effective operation, and the list of column values representing the current key.

A goal of refresh processing is to ensure that a client table Tc contains the same data values as the corresponding server table Ts at the completion of the refresh operation. Instead of sending all rows and columns of the server table Ts to the client, only those row-column values that are different between the server 10 and the client $20x$ are sent to the client. That task, however, is complicated by filters at the server 10 which filter out rows that should not be stored at the client $20x$. For example, changes to column values that appear in the filter can cause rows to be filtered into the refresh message and others, that previous to the change were replicated at the client $20x$, to be filtered out of the refresh message.

A preferred embodiment of the invention uses a smart refresh technique to refresh the client databases. Preferably, a minimum set of client effective operations needed to synchronize a client are calculated based on a knowledge of updates made to the server table Ts since the last refresh of the client. This minimum set of client effective operations for the refresh are then sent to the client in a refresh message.

To determine the set of client effective operations, the server must first determine which rows have changed in the server table since the last time the client was refreshed. Using the last-refreshed time from the refresh table Tr, the server selects from the SUL table Tu all those rows having a refresh timestamp Rtu that are later than the last-refreshed time or are null, ordering by the server key column Ks, then by the operation timestamp opt. This results in groups of records that describe operations on the server table Ts that have not been seen by the client $20x$. Each group of records for a specific value of the server key column Ks describes operations that have occurred on the corresponding row of the server table Ts. The use of the refresh timestamp Rtu to select rows from the SUL is explained below.

For each such group of records, the server determines the Server Effective Operation (SEO) and client before values as described above. However, in addition to the four types of SEO described above (Update, Insert, Delete, and NoOp) the server may detect an SEO of Send-Insert or Send-Update. This occurs if a previous operation from client $20x$ resulted in a conflict that was resolved for the server, or if the server and client $20x$ inserted identical rows or deleted the same row. The presence of Send-Insert or Send-Update in the SUL affects the calculation of the Server Effective Operation as shown in Table III below, which is an extension of Table I.

TABLE III

| pSEO(m − 1) | Ru(k(m)):op | Ru(k(m)):id = "x" | pSEO(m) | pbv(m) | Notes |
|---|---|---|---|---|---|
| Any | Send-Insert | Yes | Send-Insert | Empty | |
| Any | Send-Insert | No | pSEO(m − 1) | pbv(m − 1) | No change |
| Any | Send-Update | Yes | Send-Update | Empty | |
| Any | Send-Update | No | pSEO(m − 1) | pbv(m − 1) | No change |

In effect, the Send-Insert and Send-Update operations serve as signals which the server records for its own use during conflict detection and resolution. These signals are not actually modification operations. The Send-Insert and Send-Update signals are useful when (1) the server rejects a client operation in favor of a conflicting server operation and (2) when the client and server perform the same operation. Examples of the first scenario are when (a) the client updates and the server deletes the same row, (b) the client deletes and the server updates the same row, and (c) the client and server insert the same row with different column values. Examples of the second scenario are when (a) the client and server both delete the same row, and (b) the client and server both insert the same row with the same column values.

In these scenarios, the server performs no operations on behalf of the client in the synchronized table, so no record would normally appear in the SUL. Normal client refresh processing would, however, produce an incorrect result. A Send-Insert or Send-Update signal is inserted into the SUL so that client refresh processing can obtain a correct result. Because the Send-Insert and Send-Update signals do not result from operations on the synchronized table, they are effectively artificial entries in the SUL.

Returning to FIG. 15B, a new client $20q$ may, at time t4, attempt to insert a row using the key value k=4, which has already been inserted at the server. Assuming that this new client's $20q$ last refresh is earlier than t0, during conflict detection, the server destination calculates a Server Effective Operation (SEO) of Insert. If the resolution setting for insert conflicts is for the server to prevail, then the server creates an SUL entry for a Send-Update operation as shown. This operation instructs the server source, during refresh processing, to send a complete update (i.e., all columns) to the new client $20q$, which synchronizes the new client $20q$. Note that no values are recorded for the non-key columns C1u, C2u, C3u because they are not needed.

For each changed row in the server table Ts, the server uses the SEO, client before-values, and the filter predicate (from the catalog) to determine the client effective operation and minimum set of data fields to send to the client $20x$. Shown below is pseudo-code for an algorithm used by the server to determine what message to send to the client. There are three inputs to the algorithm: the Server Effective Operation (SEO), the result of a query to determine if the row exists in the server table Ts when the filter predicate is applied (Ts(filt)), and the result of a query on the SUL table Tu in which the first operation following the last refresh is examined to see if it satisfies the filter predicate (Tu(filt)). The resulting operation is the Client Effective Operation (CEO) sent to the client $20x$. Because the queries are expensive to process, the algorithm is ordered so that Ts(filt) and Tu(filt) are only calculated if necessary.

If SEO==NOOp
   then CEO(filt)=None
Else if ((SEO==Insert || SEO==Send-Insert) && Ts(filt)==False)
   then CEO(filt)=None
Else if ((SEO==Insert || SEO==Send-Insert) && Ts(Filt)==True)
   then CEO(filt)=Insert
Else if (SEO==Send-Update && Ts(filt)=False)
   then CEO(filt)=Delete
Else if (SEO==Send-Update && Ts(filt)==True)
   then CEO(filt)=Update (all data fields)
Else if (Ts(filt)==True && Tu(filt)==True)
   then CEO(filt)=Update (changed fields only)
Else if (Ts(filt)==False && Tu(filt)==True)
   then CEO(filt)=Delete
Else if (Ts(filt)==True && Tu(filt)==False)
   then CEO(filt)=Insert
Else Error By applying the filter predicate, the server can determine whether a row has been filtered into or filtered out of the set of rows that should be possessed by client $20x$. Filtering-in occurs when a data field value in the row changes such that the row satisfies the filter predicate. Filtering-out occurs when a data field value changes such that the row no longer satisfies the filter predicate.

When sending an update message to the client, the server uses the client's before-values (as calculated from the SUL) to determine which data field values to send to the client. The server sends only those values that differ from the client's before-values, assuring that the minimum set of data field values is sent for each row that must be updated.

While the server is determining the SEO during the client refresh process, it updates the value of any null refresh timestamp Rtu with the time at which the refresh process started, which becomes the new last-refreshed time of the client that is being refreshed. The server similarly updates any refresh timestamp whose value is later than the new last-refreshed time. This is done to make sure the server sees all operations in the SUL that took place since the last refresh operation took place, even those whose transactions started prior to the start of the last refresh operation but which committed during or after the last refresh operation. Such an operation would have an operation timestamp OPtu earlier than the client's last-refresh time, yet would not have been seen during the last refresh cycle because its transaction had not committed.

As described, the server uses the SUL table Tu for two purposes. The server uses the SUL table Tu to create a view of the client's old values for conflict detection and then a view of the client's current values for refreshing the client. Both views are deduced from the SUL table Tu without the client providing explicit information to the server. The process is based on knowing what a client's values are at the last refresh time and recreating client update activity from update operations performed by that client since that time. Consequently, the server can do conflict detection and can formulate the effective database operations needed to bring the client into synchronization with the server while minimizing the amount of information communicated to the server by the client.

Figure 16A:
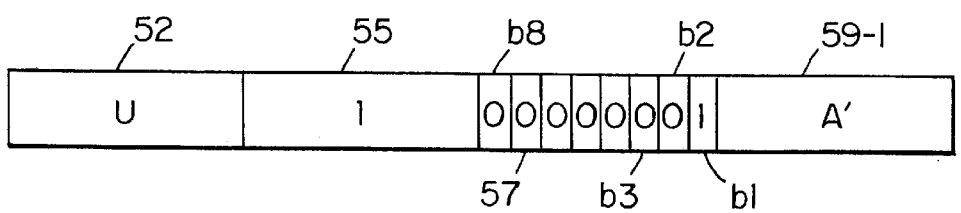
FIGS. 16A and 16B are schematic diagrams of refresh messages from the server node to the client node for the updated server table of FIG. 15A.
Figure 16B:
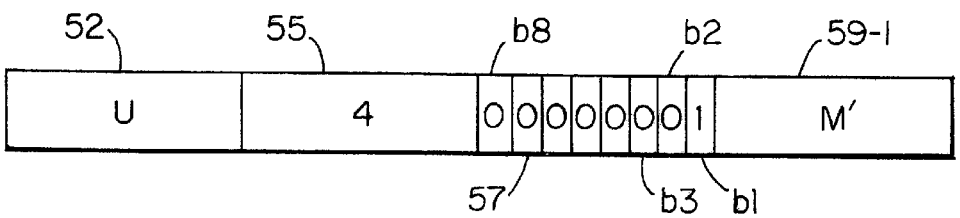

FIG. 16A and 16B are schematic diagrams of refresh messages from the server node 10 to the client node 20x for the updated server table Ts of FIG. 14A. The values for the updated data fields Rs(1)C1 and Rs(4)C1 must be propagated to the client node 20x because those values differ from the corresponding values in data fields Rc(1)C1 and Rc(4)C1 of the client table Tc. As these are both the first index position into the server-side table correspondence Ls, the first bit b1 of the column identification field 57 is set and the corresponding values A' and M' are placed in the value fields 59. The key value field 55 is set to the respective unique key values (i.e., "1" and "4"). Because all other data field values are in agreement between the server table Ts and the client table Tc, no other values are included in the refresh message.

FIGS. 17A and 17B are schematic diagrams of a synchronized client table Tc and the corresponding before-image log table Tb, respectively after applying the updates of FIGS. 15A and 15B. As illustrated, both data fields Rc(1)C1 and Rc(4)C1 are updated to the values A' and M', respectively. The before-image log table Tb is updated to equal the client-side database table Tc. The client node 20x, however, is not required to accept the updates from the server 10.

For each table refresh (set of table modifications) accepted by the client node 20x, a refresh acknowledgment is returned to the server node 10. If any table refresh is not accepted by the client node 20x, no acknowledgment is returned to the server node 10 for that table. For the above example, an acknowledgment is returned for the table T. Because the client node 20x accepted the server updates, the refresh log entry is updated to reflect the time of synchronization t1 for the updated data fields.

FIG. 18 is a schematic diagram of an updated refresh table Tr of FIG. 11C. The last time of refresh t4 for the client node 20x is recorded in the refresh time column Rt of the row keyed by the client identifier "x" in the refresh table Tr. When the refresh is completed at the time of synchronization (t3), t4 equals t3.

FIG. 19A–19B are logic tables illustrating the use of a server effective operation during the database synchronization of FIGS. 8A–18. At time t0, the column values for the server table and the client table are both equal to "A" because the two tables are synchronized. The SUL table entry is as illustrated in FIG. 15B. At time t1, the column value in the server table is modified to "A'" and the operation is recorded in the SUL table Tu as illustrated in FIG. 15B. At time t2.5, the column value at the client table changes to "A''", but no synchronization occurs. Therefore, no entry can appear in the SUL table Tu.

At time t3 (FIG. 19A), the client propagates its change value "A''" to the server. The server now walks through the server update log to determine a server effective operation. For time t0, the provisional before value is equal to "A". For time t1, an update to the column value from a source other than this client is logged in the SUL table Tu. As a result, the SEO is determined to be update with the provisional before value remaining of "A". Because the server has received instruction from the client to update the column value to "A''", the server detects an update conflict. As illustrated, the server retains its column value of "A'". That is, at a later time t3.5, neither the server nor the client have changed their column values.

At time t4 (FIG. 19B), the client request a refresh from the server. At time t4, the server again reads through the server update log table and determines a provisional before value of "A" for time t0 and an SEO of update for time t1 as above. An update operation, however, is read from the time t3 entry in the SUL table Tu of FIG. 15B. That update operation did not result from the client being refreshed. As a result, the SEO is calculated to be an update with a before value of "A". Because this row exists in both the server table Ts (FIG. 15A) and the SUL table Tu (FIG. 15B), the client effective operation (CEO) is calculated to be an update for time t4. As a result of the update synchronization at time t4, the current value of the client table entry is equal to the current value from the server table ("A'").

Although a one-to-one correspondence between the server table Ts and the client table Tc has been illustrated for ease of understanding the concepts of the invention, such a relationship between a client table Tc and a server table Ts is not required for the invention. Any server table can correspond to more than one table at a particular client. Such a relationship may be necessary where a client requires the same data to be available to multiple application programs, such as a database and a spreadsheet application.

Although the invention has been described with reference to relational database tables, other database models can also be used at either the server or the client. For example, both object-oriented and relational databases structure data as a plurality of sub-collections of objects (or rows), each of which is of the same type (or has the same fields). A table of rows can thus be modeled as a collection of objects (often called a "class") with like attributes. Conversely, data in an object-oriented database may be representable as tabular data having rows and columns of data fields. Consequently, the invention also applies to object-oriented databases to the extent that a given class has properties equivalent to that of a table in a relational database (e.g., data modifiable using insert, update and delete operations). Similarly, the invention can be applied to other database models including, but not limited to, hierarchial and network (CODASYL) databases.

Equivalents

Those skilled in the art will know, or be able to ascertain using no more than routine experimentation, many equivalents to the specific embodiments of the invention described herein. For example, although various features have been described as software routines in a preferred embodiment of the invention, it is understood that those and other features of the invention can be embodied in software, hardware or firmware. These and all other equivalents are intended to be encompassed by the following claims.

We claim:

1. A computing system for sharing data between a plurality of computers, the computing system comprising:

a first computer having a first database which includes a first collection of data representable as a first plurality of rows and a first plurality of columns;

a second computer having a second database which includes a second collection of data including data replicated from the first database, the second collection of data representable as a second plurality of rows and a second plurality of columns;

an ordered list of common columns in the first plurality of columns and the second plurality of columns; and a database synchronizer for synchronizing the first collection and the second collection at an arbitrary time, the database synchronizer using the ordered list to identify the location of data in the collections.

2. The computing system of claim 1 wherein the first database and the second database are heterogeneous.

3. The computing system of claim 1 wherein the ordered list defines a subset of the first and second collections.

4. The computing system of claim 1 further comprising:

a first catalog including the ordered list and stored on the first computer; and a second catalog including the ordered list and stored on the second computer.

5. The computing system of claim 1 wherein the database synchronizer temporarily establishes a communication link between the second computer and the first computer to transfer modification information.

6. The computing system of claim 5 further comprising a first update log stored on the first computer, the first update log including a history of modifications to data common between the first collection and the second collection.

7. The computing system of claim 1 wherein data is identified by the database synchronizer by a key value to represent a selected row of the collections and a common index into the ordered list to represent a selected column in the selected row.

8. The computing system of claim 1 wherein the first computer is a server computer sharing data in the first collection with a plurality of client computers and the second computer is a client computer.

9. The computing system of claim 1 wherein the database synchronizer uses row and column filtering of the data to limit the data synchronized between the computers.

10. The computing system of claim 1 further comprising a before-image collection of data on the second computer, the before-image collection having before-image data stored therein, the before-image data having values representing the state of the second collection at a time of last synchronization with the first collection.

11. The computing system of claim 1 further comprising a second update log stored on the second computer, the second update log including a history of modifications of data common between the second collection and the first collection.

12. The computing system of claim 1 wherein the first database is a relational database and the second database includes data accessible as tabular data.

13. A method of sharing data between a plurality of computers, comprising the steps of:

at a first computer, storing a collection of data in a first database wherein the data is representable as a first plurality of rows and a first plurality of columns;

replicating data from the first database to a second database at a second computer, wherein the data is stored into a second collection of data representable as a second plurality of rows and a second plurality of columns;

generating an ordered list of common columns in the first plurality of columns and the second plurality of columns; and synchronizing the first collection and the second collection at an arbitrary time using the ordered list to identify the location of data in the collections.

14. The method of claim 13 wherein the first database and the second database are heterogeneous.

15. The method of claim 13 wherein the step of generating the ordered list comprises defining a subset of the first and second collections.

16. The method of claim 13 further comprising the steps of:

deriving a first catalog from the ordered list and storing the first catalog on the first computer; and deriving a second catalog from the ordered list and storing the second catalog on the second computer.

17. The method of claim 13 wherein the step of synchronizing comprises:

temporarily establishing a communication link between the second computer and the first computer; and transferring modification information over the communication link.

18. The method of claim 17 further comprising the step of storing a first update log on the first computer, the first update log including a history of modifications to the columns of the first collection in the ordered list.

19. The method of claim 13 wherein the step of synchronizing comprises identifying data by a key value to represent a selected row of the collections and by a common index into the ordered list to represent a selected column in the selected row.

20. The method of claim 13 wherein the first computer is a server computer sharing data in the first collection with a plurality of client computers and the second computer is a client computer.

21. The method of claim 13 wherein the step of synchronizing comprises limiting the synchronizing of data between the computers using row and column filtering of the data.

22. The method of claim 13 further comprising the step of storing a before-image collection of data on the second computer, the before-image collection having before-image data stored therein, the before-image data having values representing the state of the second collection at a time of last synchronization with the first collection.

23. The method of claim 13 further comprising the step of storing a second update log on the second computer, the second update log including a history of modifications to the columns of the second collection in the shared list.

24. The method of claim 13 wherein the first database is a relational database and the second database includes data accessible as tabular data.

25. A method for synchronizing a plurality of tabular databases, each database maintained on a respective computer for storing a respective array of data fields arranged in rows and columns, comprising the steps of:

creating a table correspondence which defines selected columns of a first table on a first computer as being common columns in the respective tables stored on the first computer and at least one other computer, each selected column of the first table corresponding to a respective replica column of a second table on a second computer;

defining a first catalog on the first computer from the table correspondence, the first catalog including an ordered list of the selected columns of the first table;

defining a second catalog on the second computer from the table correspondence, the second catalog including an ordered list of the replica columns of the second table, the list of replica columns in the second catalog ordered to match the order of the list of selected columns in the first catalog;

for a modified row of one of the tables, determining at least one column having modified data therein;

at the respective computer, encoding the at least one modified column of the modified row into a column indicator derived from the ordered list of replica columns in the respective catalog;

at the respective computer, building a modification message including the column indicator; and transmitting the modification message to propagate the modified row from the respective computer to the other computer.

26. The method of claim 25 wherein the step of determining comprises constructing before values of data fields stored in the second table from a set of logged modification operations and comparing the before values with respective current values.

27. The method of claim 25 wherein the step of determining comprises detecting at least one difference between current values of data fields stored in the second table with before values of respective data fields stored in a before-image of the second table, the before values representing a time of last synchronization between the first and second tables.

28. The method of claim 27 wherein the before-image excludes a data field stored in the second table which is not updatable in the second table.

29. The method of claim 25 further comprising the step of validating a last synchronization of the first and second tables using before values of the data fields, the before values representing the values of data fields in the second table at a time of the last synchronization.

30. The method of claim 25 wherein the table correspondence defines a first subset of the first table and a second subset of the second table.

31. The method of claim 25 wherein the step of encoding comprises determining a respective index into the respective catalog for each modified column.

32. The method of claim 31 wherein the column indicator is a bitmapped value encoding the respective indices of a plurality of modified columns.

33. The method of claim 31 wherein the step of encoding comprises dynamically selecting an encoding technique based on the resulting size of the column indicator.

34. The method of claim 25 wherein the step of transmitting the update message comprises establishing a temporary communication link between the first and second computers prior to transmitting the modification message.

35. The method of claim 25 further comprising the steps of:

receiving the modification message at the first computer; and updating a corresponding row in the first table from the modification message.

36. The method of claim 25 wherein the step of determining comprises detecting at least one difference between current values of data fields stored in the first table and deduced current values of data fields stored in the second table.

37. The method of claim 36 wherein the step of detecting comprises deducing the current values of data fields stored in the second table from an update log having stored therein a history of modifications to the first table maintained on the first computer.

38. The method of claim 25 further comprising the steps of:

receiving the modification message at the second computer; and updating a corresponding row in the second table from the update message.

39. The method of claim 25 wherein the first and second databases are heterogenous.

40. The method of claim 25 wherein at least one of the tabular databases is a relational database.

41. A database synchronizer for synchronizing a plurality of tabular databases, each database maintained on a respective computer for storing an array of data fields arranged in rows and columns, the database synchronizer comprising:

a table correspondence which defines selected columns of a first table on a first computer as being common columns in the respective tables stored in the first computer and at least one other computer, each selected column of the first table corresponding to a respective replica column of a second table on a second computer;

a first catalog derived from the table correspondence and stored on the first computer, the first catalog including an ordered list of the selected columns of the first table;

a second catalog derived from the table correspondence and stored on the second computer, the second catalog including an ordered list of the replica columns of the second table, the list of replica columns in the second catalog ordered to match the order of the list of selected columns in the first catalog;

for a modified row of one of the tables, at least one column having modified data therein;

at the respective computer, a column indicator having encoded therein the at least one modified column of the modified row, the column indicator derived from the ordered list of columns in the respective catalog;

at the respective computer, a modification message which includes the column indicator; and a transmission link for transmitting the modification message to propagate the modified row from the respective computer to another computer.

42. The database synchronizer of claim 41 further comprising a set of logged modification operations for data fields of the second table.

43. The database synchronizer of claim 41 further comprising a before-image of the second table having before values of the data fields of the second table, the before values representing a time of last synchronization between the first and second tables.

44. The database synchronizer of claim 43 wherein the before-image excludes a data field stored in the second table which is not updatable in the second table.

45. The database synchronizer of claim 41 wherein the table correspondence defines a first subset of the first table and a second subset of the second table.

46. The database synchronizer of claim 41 wherein the column indicator comprises a respective index into the respective catalog for each modified column.

47. The database synchronizer of claim 46 wherein the column indicator is a bitmapped value encoding the respective indices of a plurality of modified columns.

48. The database synchronizer of claim 46 wherein the column indicator is encoded by an encoding technique based on the resulting size of the column indicator.

49. The database synchronizer of claim 41 wherein the communication link is temporary.

50. The database synchronizer of claim 41 further comprising a corresponding row in the first table updated from data in the modification message.

51. The database synchronizer of claim 41 further comprising:

an update log having stored therein a history of modifications to the first table maintained on the first computer; and before values of the data fields of the second table deduced from the update log.

52. The database synchronizer of claim 41 further comprising a corresponding row in the second table updated from data in the modification message.

53. The database synchronizer of claim 41 wherein the first and second databases are heterogenous.

54. The database synchronizer of claim 41 wherein at least one of the tabular databases is a relational database.

* * * * *